United States Patent
Klemm

(10) Patent No.: US 10,289,728 B2
(45) Date of Patent: May 14, 2019

(54) GARBAGE COLLECTION OF PERSISTENT OBJECTS WITH DYNAMIC MULTIKEYS

(75) Inventor: Reinhard Peter Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1713 days.

(21) Appl. No.: 11/383,268

(22) Filed: May 15, 2006

(65) Prior Publication Data

US 2007/0276888 A1    Nov. 29, 2007

(51) Int. Cl.
*G06F 17/30* (2006.01)
*G06F 12/02* (2006.01)

(52) U.S. Cl.
CPC .... *G06F 17/30607* (2013.01); *G06F 12/0253* (2013.01)

(58) Field of Classification Search
CPC ...... G06F 12/0253; G06F 21/62; G06F 8/315; G06F 9/465; G06F 17/30607; G06F 17/30569; G06F 17/30595; G06F 8/24; G06F 9/4435; G06F 17/30309; G06F 17/30575; G06F 12/084; G06F 2212/702; G06F 2221/2143; G06F 12/0269; G06F 17/30117; G06F 17/3089; G06F 9/544; G06F 12/0815; G06F 9/449; G06F 21/64; Y10S 707/99957; Y10S 707/99953; Y10S 707/99943; Y10S 707/99945; Y10S 707/99947
USPC ..... 707/102, 206, 200, 999.2, 999, 999.002, 707/748, 812, 999.202, 999.001, 610, 707/618, 797, 798, 802, 803, 809; 711/133–136; 717/152, 166, 177, 116, 717/120, 714, 716; 715/234, 753, 791, 715/792, 802; 709/203, 230, 234
See application file for complete search history.

(56) References Cited

U.S. PATENT DOCUMENTS

| | | | | |
|---|---|---|---|---|
| 5,398,334 | A | * | 3/1995 | Topka et al. .................. 707/206 |
| 5,590,332 | A | * | 12/1996 | Baker ................. G06F 12/0253 707/999.202 |
| 5,724,575 | A | * | 3/1998 | Hoover et al. |
| 5,819,299 | A | | 10/1998 | Bejar |
| 5,991,779 | A | | 11/1999 | Bejar |
| 6,009,266 | A | | 12/1999 | Brownell et al. |
| 6,052,699 | A | * | 4/2000 | Huelsbergen ....... G06F 12/0269 |
| 6,128,623 | A | * | 10/2000 | Mattis et al. ............. 707/103 R |
| 6,301,582 | B1 | | 10/2001 | Johnson et al. |

(Continued)

OTHER PUBLICATIONS

U.S. Appl. No. 11/383,271, Klemm, filed May 15, 2006.
U.S. Appl. No. 11/383,273, Klemm, filed May 15, 2006.

*Primary Examiner* — Arpan P. Savla
*Assistant Examiner* — Bao G Tran
(74) *Attorney, Agent, or Firm* — Sheridan Ross P.C.

(57) ABSTRACT

A mechanism is disclosed that enables garbage collection of object instances that have persistent data and a mutable key. A mutable key capability is advantageous in a variety of applications, such as monitoring a set of users and their login status on a plurality of media servers (e.g., an email server, an instant messaging server, a voice mail server, a video server, an audio-conferencing server, etc.). Implementations based on the Enterprise JavaBean specification are disclosed for three illustrative embodiments of the present invention. The illustrative embodiments of the present invention can also be implemented in accordance with object persistence mechanisms other than Enterprise JavaBeans.

21 Claims, 19 Drawing Sheets

(56) References Cited

U.S. PATENT DOCUMENTS

| | | | |
|---|---|---|---|
| 6,453,321 B1 | 9/2002 | Hill et al. | |
| 6,456,995 B1 * | 9/2002 | Salo | G06F 17/30595 707/703 |
| 6,493,730 B1 | 12/2002 | Lewis et al. | |
| 6,567,905 B2 | 5/2003 | Otis | |
| 6,591,272 B1 * | 7/2003 | Williams | 707/102 |
| 6,694,328 B1 * | 2/2004 | Bennett | |
| 6,701,520 B1 * | 3/2004 | Santosuosso | G06F 8/4441 707/999.202 |
| 6,769,124 B1 | 7/2004 | Schoening et al. | |
| 6,912,520 B2 | 6/2005 | Hankin et al. | |
| 6,959,307 B2 | 10/2005 | Apte | |
| 6,999,964 B2 | 2/2006 | Graser et al. | |
| 7,051,051 B1 | 5/2006 | Stegelmann | |
| 7,073,171 B2 | 7/2006 | Shinn et al. | |
| 7,114,152 B2 * | 9/2006 | Hogstrom et al. | 717/166 |
| 7,403,942 B1 * | 7/2008 | Bayliss | G06F 17/30303 707/748 |
| 7,590,639 B1 * | 9/2009 | Ivanova | G06F 17/30377 |
| 7,747,659 B2 * | 6/2010 | Bacon | G06F 12/0253 707/816 |
| 7,954,110 B1 | 5/2011 | Lue-Sang et al. | |
| 2001/0047391 A1 | 11/2001 | Szutu | |
| 2001/0051948 A1 | 12/2001 | Srinivasan et al. | |
| 2002/0188616 A1 * | 12/2002 | Chinnici et al. | 707/102 |
| 2003/0046355 A1 | 3/2003 | Rosenberg et al. | |
| 2003/0208490 A1 | 11/2003 | Larrea et al. | |
| 2003/0221073 A1 * | 11/2003 | Saltz | G06F 9/4435 711/159 |
| 2004/0133552 A1 * | 7/2004 | Greenfield et al. | 707/1 |
| 2005/0187955 A1 | 8/2005 | Bahulkar et al. | |
| 2005/0234976 A1 | 10/2005 | Oara et al. | |
| 2005/0246485 A1 * | 11/2005 | Assaf et al. | 711/112 |
| 2005/0246685 A1 * | 11/2005 | Braddock, Jr. | 717/116 |
| 2006/0074990 A1 * | 4/2006 | Burka | G06F 12/0269 |
| 2006/0143223 A1 | 6/2006 | Ivanova | |
| 2006/0184568 A1 | 8/2006 | Barcia | |
| 2006/0195788 A1 * | 8/2006 | Okamoto et al. | 715/700 |
| 2006/0206507 A1 | 9/2006 | Dahbour | |
| 2006/0230019 A1 * | 10/2006 | Hill et al. | 707/2 |
| 2007/0022149 A1 * | 1/2007 | Bacon et al. | 707/206 |
| 2007/0255751 A1 | 11/2007 | Bansal et al. | |
| 2008/0066054 A1 * | 3/2008 | Shinn et al. | 717/120 |

\* cited by examiner

GARBAGE COLLECTION OF PERSISTENT OBJECTS WITH DYNAMIC MULTIKEYS

FIELD OF THE INVENTION

The present invention relates to software in general, and, more particularly, to the generation of persistent objects that have mutable keys.

BACKGROUND OF THE INVENTION

Object persistence is a mechanism by which an object instance that resides in volatile memory (e.g., random-access memory [RAM], etc.) is mapped to a database, thereby providing permanent storage of the object instance's data. For example, if a source program creates and instantiates a persistent employee object instance, the data associated with the object instance is automatically stored in a database, without any explicit programming. As a result, if a hardware failure were to occur during the execution of a program that processes employee records, the most recent data for the employees would automatically be retained. Object persistence thus provides a mechanism for the permanent storage of data.

Object persistence also provides a mechanism for mapping an object instance's fields to a database, thereby enabling a programmer to (i) retrieve object information from a database without writing explicit database-handling code, and (ii) manipulate objects without having to constantly save changes back to the database. When persistent objects are mapped to a relational database, the mapping mechanism is referred to as object-relational mapping.

FIG. 1 depicts an illustrative object-relational mapping between object class 100 and database schema 110, in accordance with the prior art.

Object class 100 is a class named User that comprises six fields: ssn, lastName, firstName, birthdate, zipCode, and gender. As indicated by the underlined bold typeface, field ssn, which corresponds to social security number, is the key for object class 100 (i.e., each instance of User is uniquely identified by its ssn value).

Database schema 110 is a relation that comprises six attributes: Last, First, SSN (the schema key), Zip, Sex, and DOB.

The dotted arrows in FIG. 1 indicate the object-relational mapping between fields of object class 100 and attributes of database schema 110. As will be appreciated by those skilled in the art, a complete specification of object class 100 and database schema 110 would include data type information for the fields and attributes.

FIG. 2 depicts illustrative object instances 200-1 and 200-2, and illustrative database table 210 in accordance with the prior art.

Object instances 200-1 and 200-2, named user1 and user2, respectively, are instances of object class 100.

Database table 210 is a table in accordance with database schema 110. As shown in FIG. 2, database table 210 comprises rows 220-1 through 220-N, where N is a positive integer.

The arrows in FIG. 2 indicate illustrative object-relational mappings between database table 210 and object instances 200-1 and 200-2. In particular, object instance 200-1 is mapped to table row 220-2, and object instance 200-2 is mapped to table row 220-N, in accordance with the object-relational mapping of FIG. 1. The mapping between an object instance and a table row indicates that either:

(i) the object instance was created (e.g., by a constructor, factory method, etc.) and its field values were then automatically persisted in the table row; or (ii) the object instance was instantiated with the pre-existing attribute values of the table row.

In case (ii), the object instance is instantiated by invoking a finder method that:

(a) takes the value of a key (in this case, a social security number) as an argument, and (b) instantiates the fields of the object instance with the attribute values of the table row.

Enterprise JavaBeans is a specification from Sun Microsystems® for both object persistence and transaction processing. In particular, the Enterprise JavaBean (EJB) specification defines entity beans, which are persistent objects that are mapped to a relational database, and session beans, which are used to process transactions and are not persistent.

Entity Beans have at least one primary key that uniquely identifies each bean instance. The primary key can consist of a single field (e.g., social security number, etc.), or a plurality of fields. As an example of the latter, an entity bean for storing sales records might use the social security number of the sales agent in combination with the date/time of the sale as the primary key.

In accordance with the Enterprise JavaBean (EJB) specification, primary keys are immutable—i.e., their value must be specified when an entity bean instance is created, and their value cannot change during the life of the entity bean instance. Entity bean fields that do not belong to a primary key, in contrast, are mutable—i.e., their value can change during the life of the entity bean instance, and they do not have to be initialized when the entity bean instance is created.

SUMMARY OF THE INVENTION

In some situations it would be advantageous to have an entity Enterprise JavaBean (or another kind of persistent object) with a primary key that is mutable. For example, consider an application that monitors a set of users and their login status on various media servers such as email, instant messaging, voice mail, video, and audio-conferencing servers. The email server identifies a particular user U by his or her email address; the audio-conferencing server identifies user U by his or her telephone number; and so on.

In such an application, it would be natural to have a User entity bean that has a first primary key field for the user's email address, a second primary key field for the user's telephone number, etc., and to have the media servers report the login status of users to the User entity beans. The problem, however, is that the set of identifying information for a user can change over time, and typically only a subset of this information is known initially. For example, a user might first log in to an email server, ten minutes later log in to an audio-conferencing server, five minutes later log out of the email server, and so on. However, because entity JavaBean primary keys are immutable, the user's log-in information for all possible media servers would have to be specified as soon as the user logged into any one of the media servers. Furthermore, the User entity bean could not reflect changes in the user's log-in status over time.

The present invention addresses this problem via a mechanism that enables the generation of objects with persistent data and a mutable key, as well as garbage collection for such objects. Implementations are disclosed for three illustrative embodiments based on the Enterprise JavaBean specification. The illustrative embodiments can also be implemented in accordance with object persistence mechanisms other than Enterprise JavaBeans.

The illustrative embodiment comprises: destroying a first object instance that has one or more persistent fields and a method for accessing a mutable key.

DETAILED DESCRIPTION

The terms appearing below are given the following definitions for use in this Description and the appended Claims.

For the purposes of the specification and claims, the term "persistent object instance" is an object instance that is mapped to a record in a persistent store. The mapping might be managed by one or more methods of the object instance, or might be managed automatically by a separate persistence mechanism. An Enterprise JavaBeans entity bean instance is an example of a persistent object instance.

For the purposes of the specification and claims, the term "persistent field" is an object field whose value is mirrored in a persistent store (e.g., a database, etc.) without explicit programming by the developer who created the object or the class to which the object belongs. A persistent field might belong to a non-persistent object instance, such as a field of a regular Java class, as well as to a persistent object instance.

For the purposes of the specification and claims, the term "key" is a datum, or a collection of data, that uniquely identifies an entity. Examples of keys include an Enterprise JavaBean primary key, a key of a table in a relational database, and so forth.

The illustrative embodiments of the present invention, described below and with respect to FIGS. 3 through 19, are disclosed in the context of Enterprise JavaBeans; however, it will be clear to those skilled in the art how to make and use alternative embodiments that are based on other object persistence mechanisms.

Figure 1:
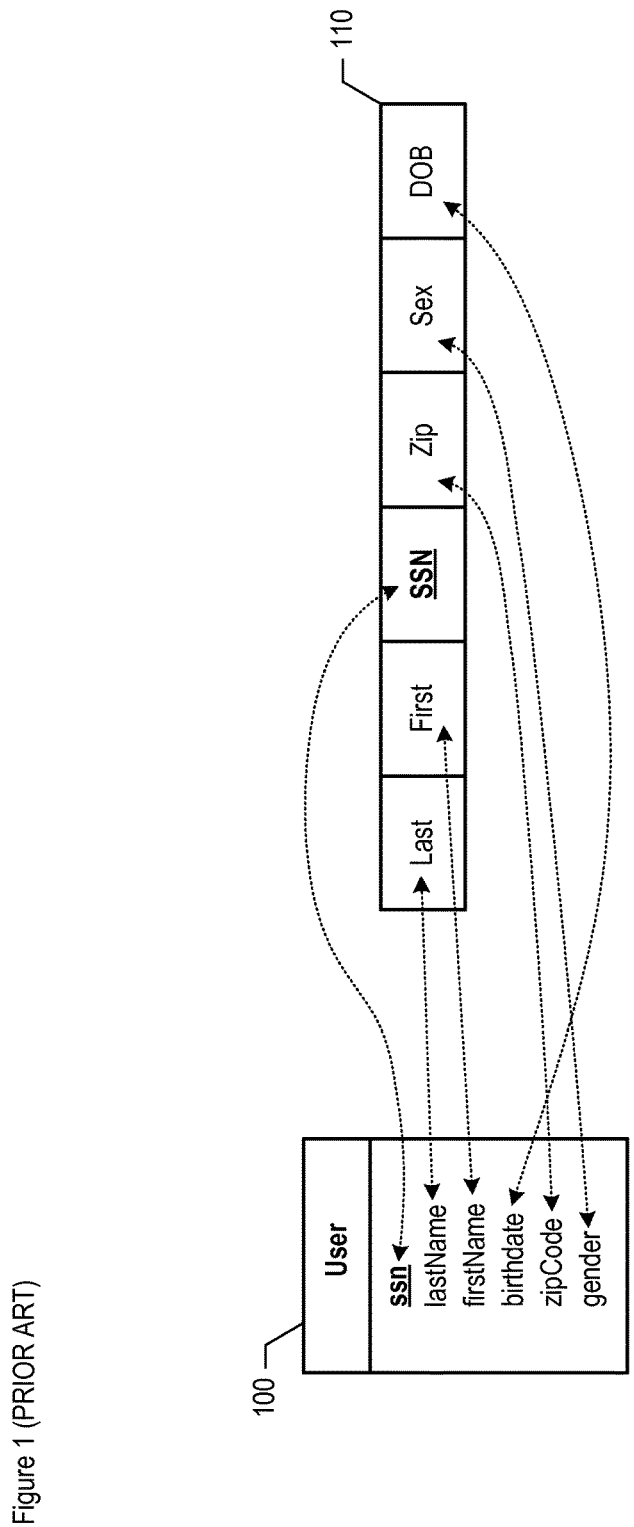
FIG. 1 depicts an illustrative object-relational mapping, in accordance with the prior art.
Figure 2:
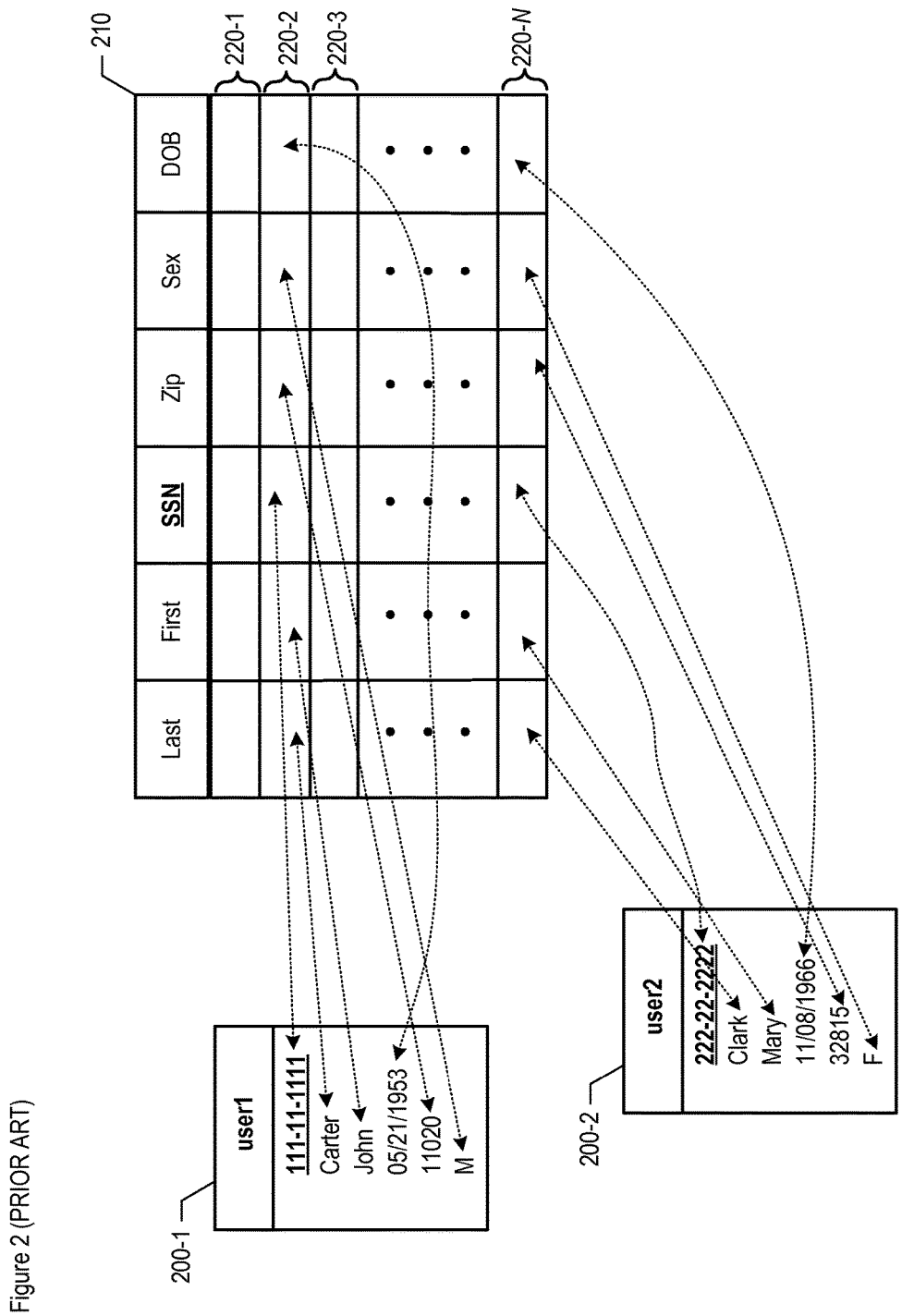
FIG. 2 depicts two illustrative object instances of object class 100, as shown in FIG. 1, and an illustrative database table corresponding to database schema 110, as shown in FIG. 1, in accordance with the prior art.
Figure 3:
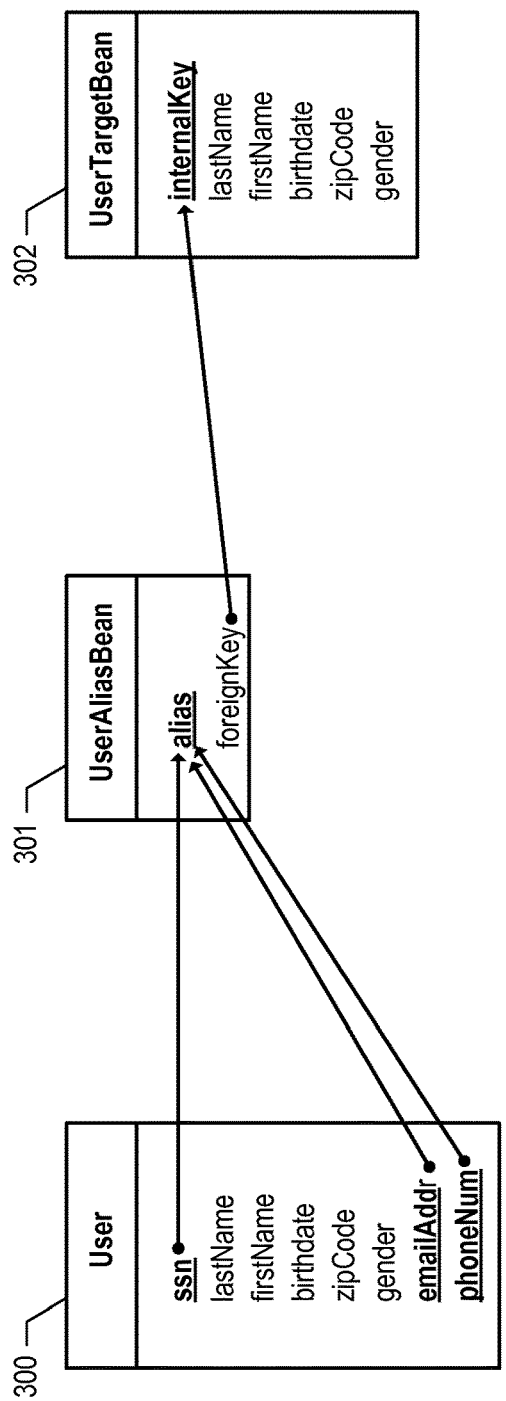
FIG. 3 depicts three illustrative object classes, in accordance with the first illustrative embodiment of the present invention.

FIG. 3 depicts three illustrative object classes, in accordance with the first illustrative embodiment of the present invention.

Object class 300 is named User and comprises eight fields: ssn (the key), lastName, firstName, birthdate, zipCode, gender, emailAddr, and phoneNum. In accordance with the first illustrative embodiment, object class 300 is a regular Java class. However, it will be clear to those skilled in the art how to make and use alternative embodiments in which class 300 is a session Enterprise JavaBean, or an inner class of a Java servlet, or some other kind of class.

Object class 301 is an entity bean class (i.e., a class that implements interface javax.ejb.EntityBean and has persistent instances) named UserAliasBean that comprises two fields: immutable key alias, and foreignKey.

Object class 302 is an entity bean class named UserTargetBean that comprises six fields: immutable key internalKey, whose values are automatically generated by the relational database management system; lastName; firstName; birthdate; zipcode; and gender.

As depicted by the arrows in FIG. 3, object classes 300, 301, and 302, are related as follows: ssn, emailAddr, and phoneNum of User 300 relate to alias of UserAliasBean 301; and foreignKey of UserAliasBean 301 relates to UserTargetBean 302.

Figure 4:
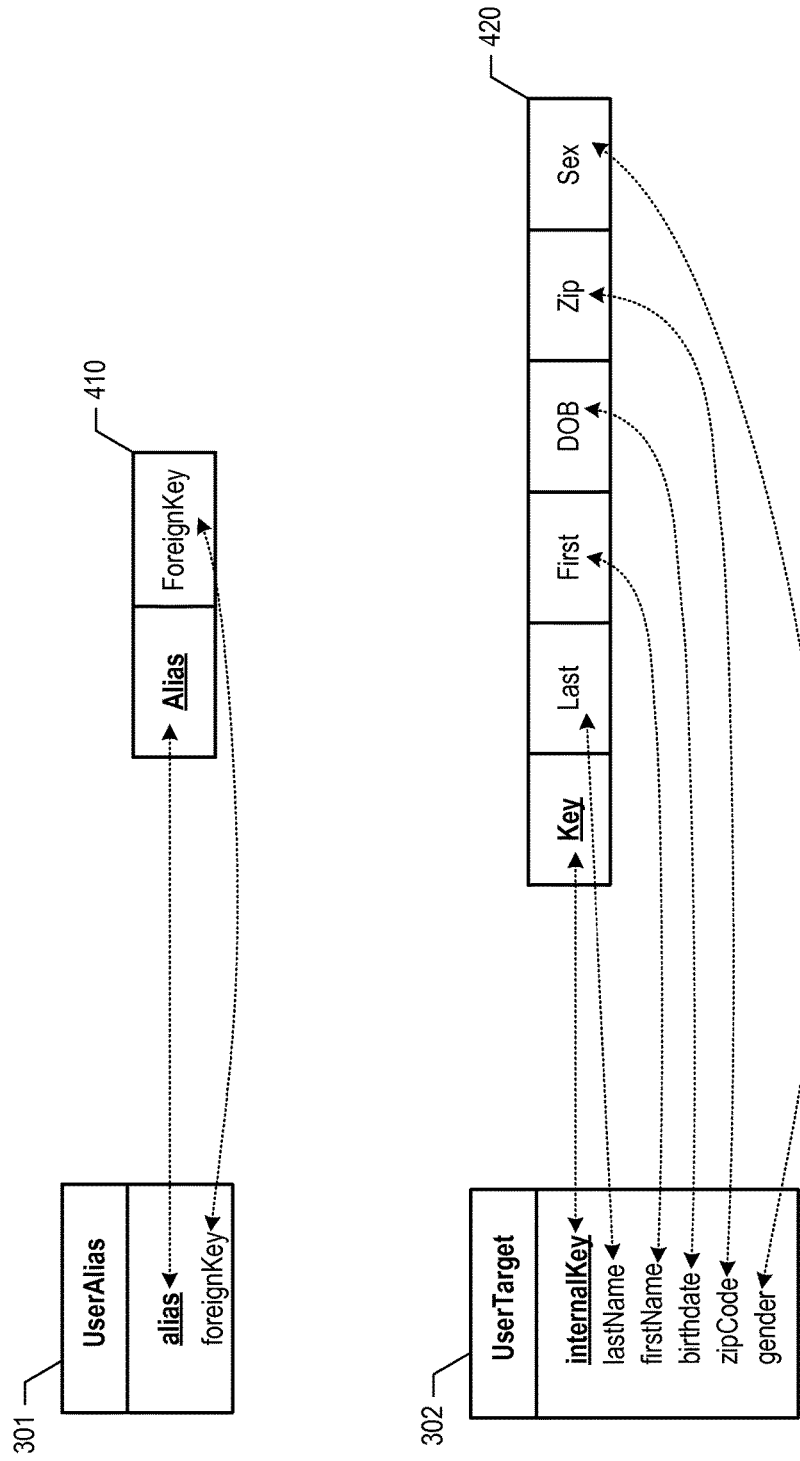
FIG. 4 depicts illustrative object-relational mappings for classes 301 and 302, as shown in FIG. 3, in accordance with the first illustrative embodiment of the present invention.

FIG. 4 depicts illustrative object-relational mappings for classes 301 and 302, in accordance with the first illustrative embodiment of the present invention. As depicted by the dotted arrows, the fields of class 301 are mapped to attributes of two relational database schemas: schema 410 and schema 420.

Figure 5:
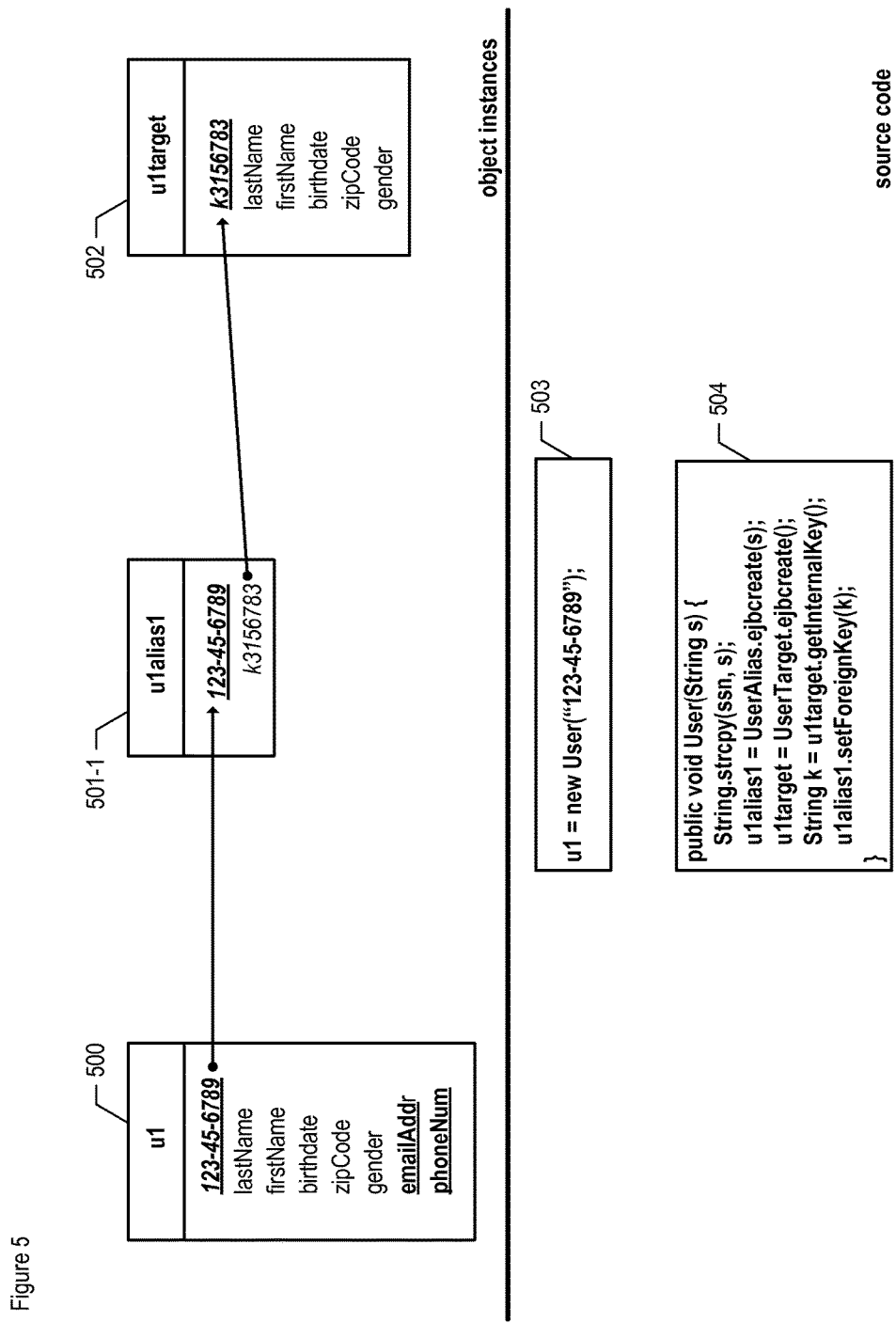
FIG. 5 depicts object instances of class 300, 301, and 302 after the execution of illustrative source code 503, in accordance with the first illustrative embodiment of the present invention.

FIG. 5 depicts object instances of class 300, 301, and 302 and illustrative source code 503 and 504, in accordance with the first illustrative embodiment of the present invention. Object instances 500, 501-1, and 502 are instances of class 300, 301, and 302, respectively, that are created as a result of the execution of illustrative source code 503. As shown in FIG. 5, illustrative source code 503 creates object instance 500 via a conventional Java constructor. It will be appreciated by those skilled in the art that in some other embodiments of the present invention, source code 503 might instead create object instance 500 via a factory pattern (e.g., when object instance 500 is a session Enterprise JavaBean, etc.).

FIG. 5 also depicts illustrative source code 504, which comprises an illustrative implementation of the User( ) constructor. This implementation:
  takes a String argument that corresponds to social security number and copies the argument into object instance 500's field ssn;
  creates UserAlias bean 501-1, whose alias is the social security number;
  creates UserTarget bean 502; and
  sets the value of the foreign key of UserAlias bean 501-1 to the internal key of UserTarget bean 502.

Figure 6:
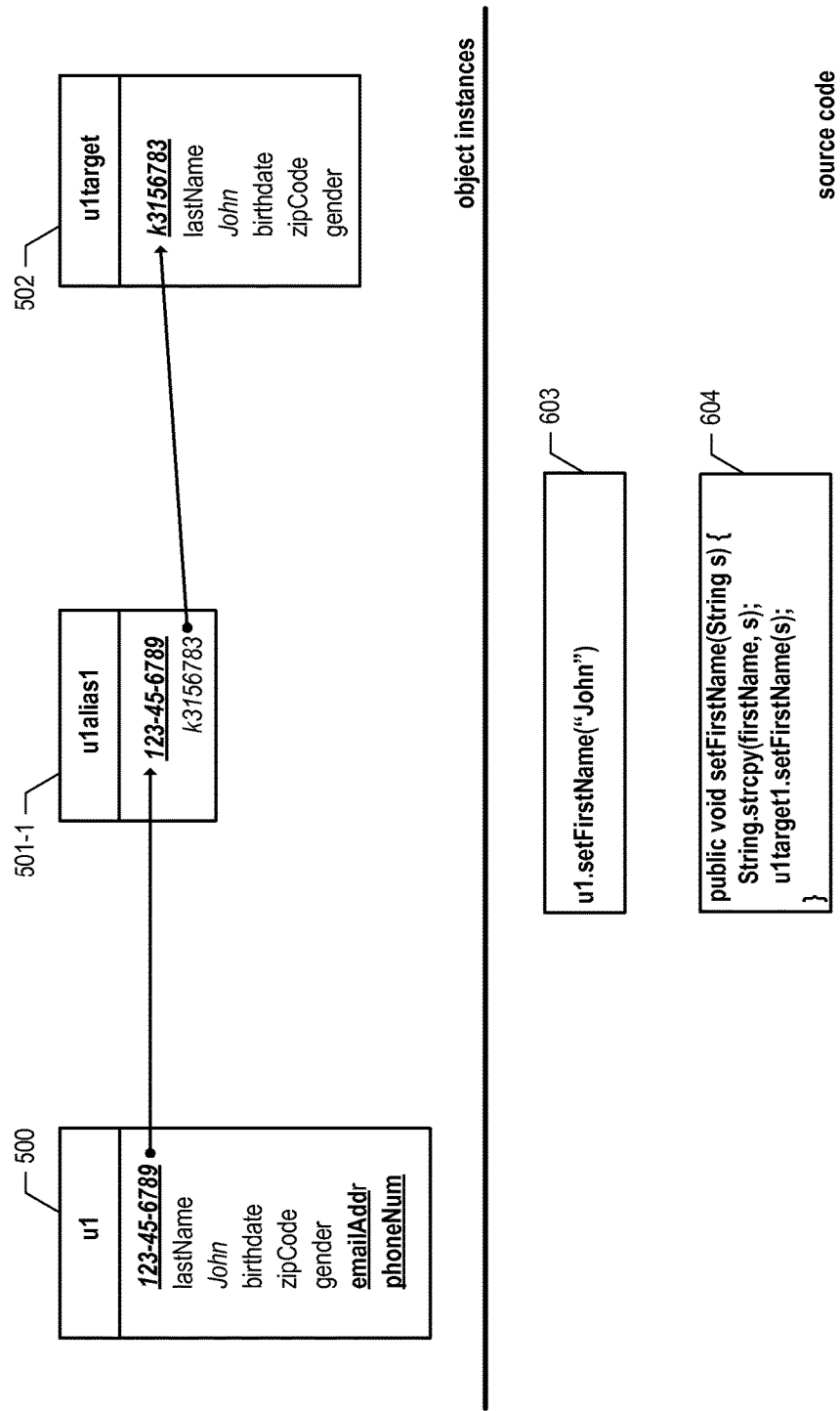
FIG. 6 depicts object instances 500, 501-1, and 502, as shown in FIG. 5, after the execution of illustrative source code 603, in accordance with the first illustrative embodiment of the present invention.

FIG. 6 depicts object instances 500, 501-1, and 502 after the execution of illustrative source code 603, in accordance with the first illustrative embodiment of the present invention. Illustrative source code 603 is a Java statement that invokes a method setFirstName( ) of object instance 500 with the String argument "John".

FIG. 6 also depicts illustrative source code 604, which comprises an illustrative implementation of method setFirstName( ). This implementation:
  takes a String argument and copies the argument into object instance 500's field firstName; and
  invokes UserAlias bean 502's setFirstName( ) method with the String argument.

Figure 7:
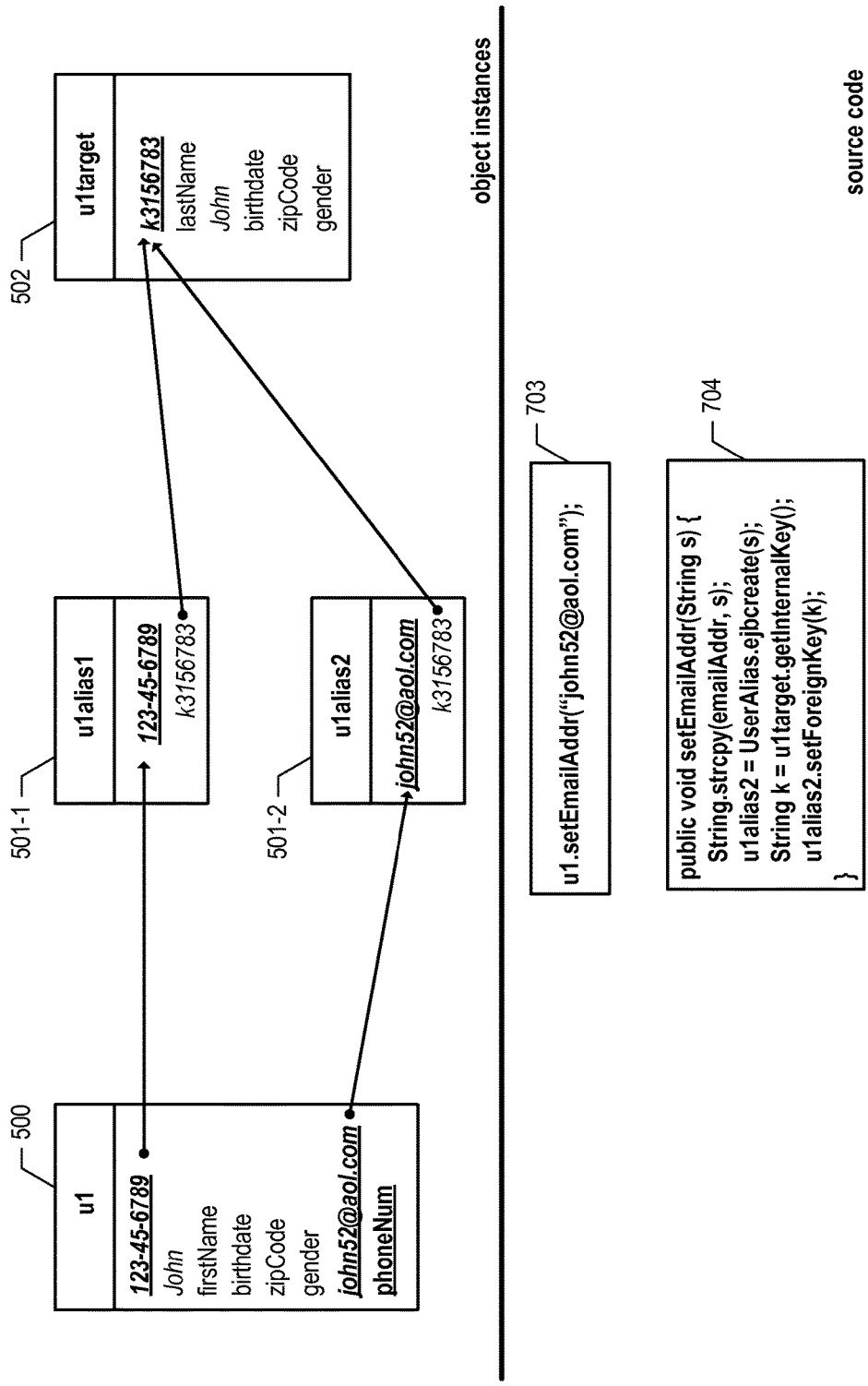
FIG. 7 depicts object instances 500, 501-1, 501-2, and 502 after the execution of illustrative source code 703, in accordance with the first illustrative embodiment of the present invention.

FIG. 7 depicts object instances 500, 501-1, and 502, as well as a new object instance 501-2, after the execution of illustrative source code 703, in accordance with the first illustrative embodiment of the present invention. Object instance 501-2 is an instance of class 301 that is created as a result of the execution of illustrative source code 703. Illustrative source code 802 is a Java statement that invokes a method setEmailAddr( ) of object instance 500 with the String argument "john52@aol.com".

FIG. 7 also depicts illustrative source code 704, which comprises an illustrative implementation of method setEmailAddr( ). This implementation:
  takes a String argument and copies the argument into object instance 500's field emailAddr;
  creates UserAlias bean 501-2, whose alias is the email address;
  sets the value of the foreign key of UserAlias bean 501-2 to the internal key of UserTarget bean 502.

Figure 8:
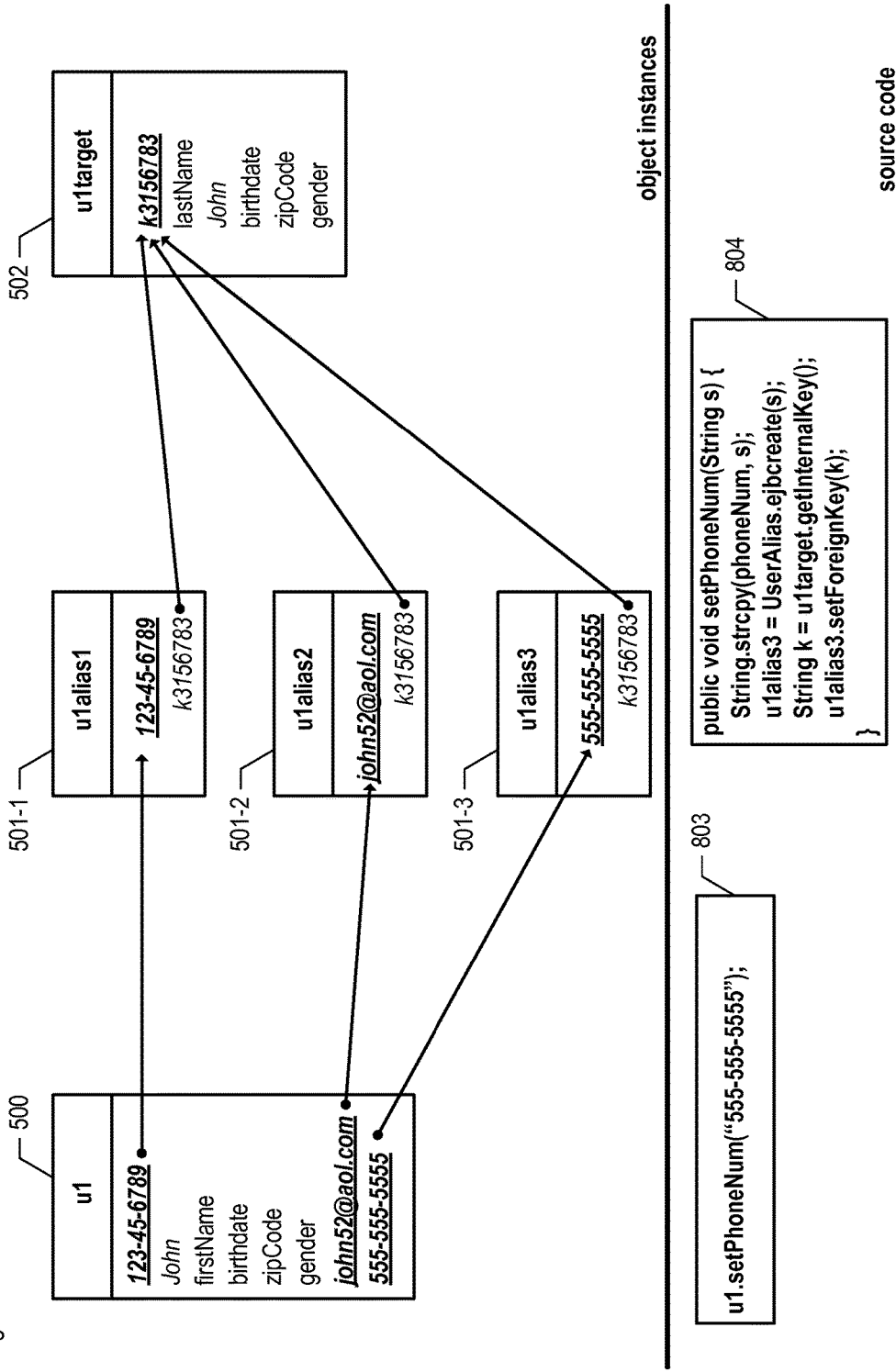
FIG. 8 depicts object instances 500, 501-1, 501-2, 501-3, and 502 after the execution of illustrative source code 803, in accordance with the first illustrative embodiment of the present invention.

FIG. 8 depicts object instances 500, 501-1, 501-2, and 502, as well as a new object instance 501-3, after the execution of illustrative source code 803, in accordance with the first illustrative embodiment of the present invention. Object instance 501-3 is an instance of class 301 that is created as a result of the execution of illustrative source code 803. Illustrative source code 803 is a Java statement that invokes a method setPhoneNum( ) of object instance 500 with the String argument "555-555-5555".

FIG. 8 also depicts illustrative source code 804, which comprises an illustrative implementation of method setPhoneNum( ). This implementation:
  takes a String argument and copies the argument into object instance 500's field phoneNum;
  creates UserAlias bean 501-3, whose alias is the phone number;
  sets the value of the foreign key of UserAlias bean 501-3 to the internal key of UserTarget bean 502.

In accordance with the first illustrative embodiment, class 300 provides three finder methods for finding instances of class 300 based on the value of a key:
  static User findBySsn(String ssn)
  static User findByEmailAddress(String emailAddr)
  static User findByPhoneNumber(String phoneNum)
(The keyword "static" indicates that the methods belong to class 300, rather than instances of class 300). Each of the finder methods above invokes the EJB finder method of UserAliasBean with the specified key value as argument, and UserAliasBean's EJB finder method in turn invokes the EJB finder method of UserTargetBean with the foreignKey value as argument. A new User instance can then be created and instantiated with the data from the retrieved UserAliasBean and UserTargetBean.

As will be appreciated by those skilled in the art, class 300 can also have data accessor methods (i.e., get methods) and "business" methods—as object classes typically do—and it will be clear to those skilled in the art, after reading this disclosure, how to make and use such embodiments of class 300.

As will further be appreciated by those skilled in the art, in accordance with the first illustrative embodiment there is a variety of options for handling the destruction of object instances (or "garbage collection"). In some embodiments in which class 300 is defined in a programming language that supports destructors (e.g., C++, etc.), class 300 might have a destructor for destroying instances of the class. In some other embodiments—including those that use a programming language with no destructors (e.g., Java, etc.)—class 300 might have unset methods (e.g., unsetEmailAddr( ), etc.) that
  (a) determine the number N of associated instances of class 301; and
  (b) when N>1:
    destroy the instance of class 301 associated with the particular field (e.g., field emailAddr for method unsetEmailAddr( ), etc.), and
    clear the value of the particular field in the instance of class 300;
  otherwise (N=1):
    identify the single associated instance of class 301,
    identify the single associated instance of class 302,
    destroy the instance of class 302,
    destroy the instance of class 301,
    clear the value of the particular field in the instance of class 300, and
    mark the instance of class 300 as ready for garbage collection.

As will be appreciated by those skilled in the art, in some embodiments, the destruction of instances of class 302 and 301 by an unset method might be subject to object locking via a transaction or some other means of concurrency control. Furthermore, some embodiments of the present invention that use a programming language with support for destructors might define class 300 to have both a destructor and one or more unset methods.

Figure 9:
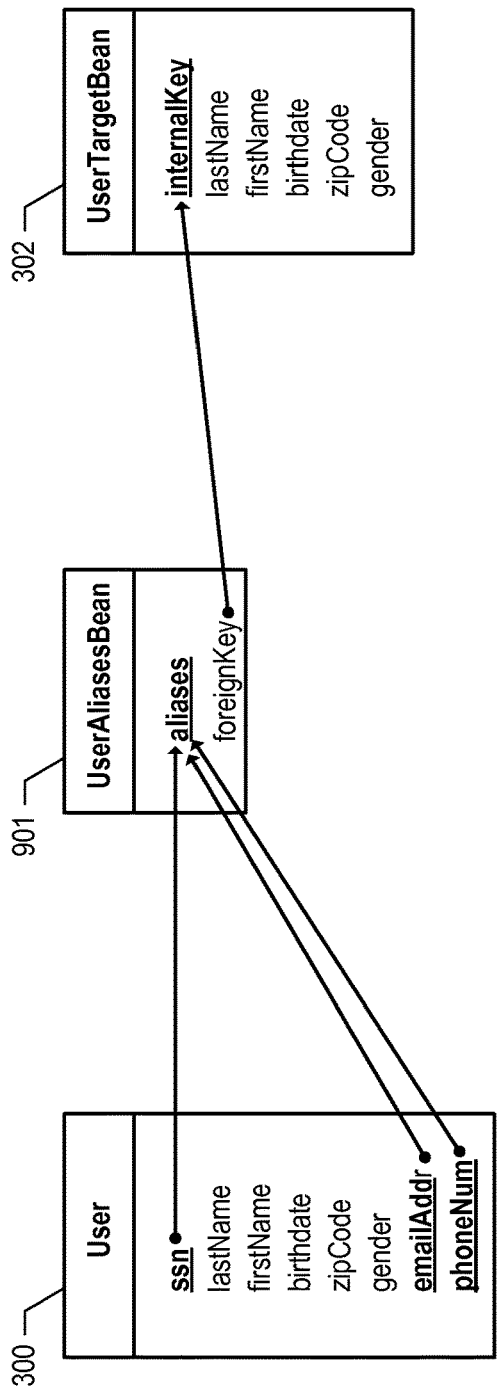
FIG. 9 depicts three illustrative object classes, in accordance with the second illustrative embodiment of the present invention.

FIG. 9 depicts three illustrative object classes, in accordance with the second illustrative embodiment of the present invention.

Object classes 300 and 302 are carried over from the first illustrative embodiment.

Object class 901 is an entity bean class named UserAliasesBean that is similar to class 301 (UserAliasBean) except that its key field, named aliases instead of alias, is a set that is capable of storing a plurality of aliases (i.e., any two or all three of the user's social security number, email address, and phone number).

Figure 10:
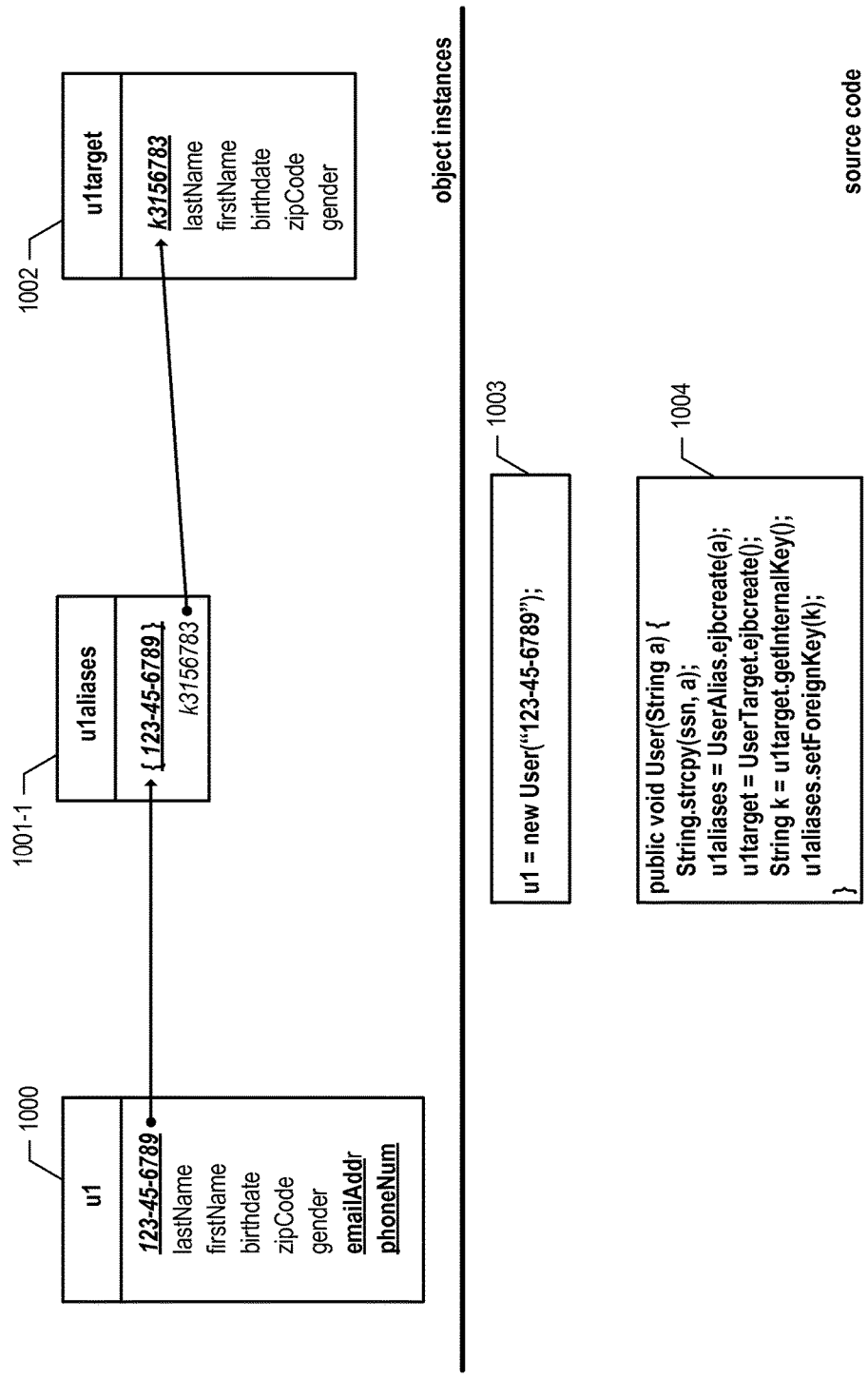
FIG. 10 depicts object instances of class 300, 901, and 302 after the execution of illustrative source code 1003, in accordance with the second illustrative embodiment of the present invention.

FIG. 10 depicts object instances of class 300, 901, and 302 and illustrative source code 1003 and 1004, in accordance with the second illustrative embodiment of the present invention. Object instances 1000, 1001-1, and 1002 are instances of class 300, 901, and 302, respectively, that are created as a result of the execution of illustrative source code 1003. As shown in FIG. 10, illustrative source code 1003 creates object instance 1000 via a conventional Java constructor. It will be appreciated by those skilled in the art that in some other embodiments of the present invention, source code 1003 might instead create object instance 1000 via a factory pattern (e.g., when object instance 1000 is a session Enterprise JavaBean, etc.).

FIG. 10 also depicts illustrative source code 1004, which comprises an illustrative implementation of the User( ) constructor in accordance with the second illustrative embodiment. This implementation:
- takes a String argument that corresponds to social security number, and copies the argument into object instance 1000's field ssn;
- creates UserAliases bean 1001-1 with its aliases field initialized to a singleton containing the social security number;
- creates UserTarget bean 1002; and
- sets the value of the foreign key of UserAliases bean 1001-1 to the internal key of UserTarget bean 1002.

Figure 11:
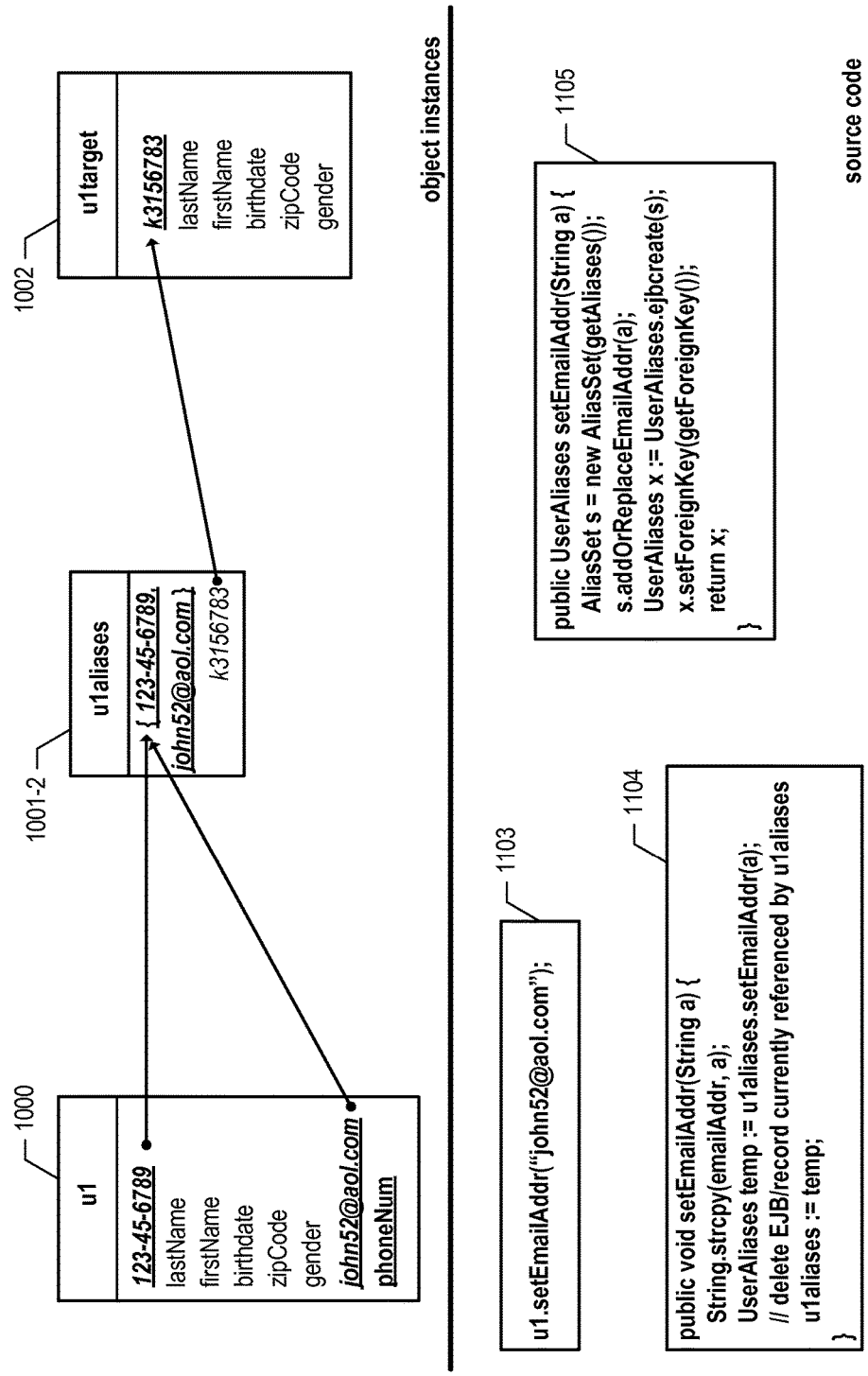
FIG. 11 depicts object instances 1000 and 1002, as shown in FIG. 10, and new object instance 1001-2 after the execution of illustrative source code 1103, in accordance with the second illustrative embodiment of the present invention.

FIG. 11 depicts object instances 1000 and 1002 and new object instance 1001-2 after the execution of illustrative source 1103, in accordance with the second illustrative embodiment of the present invention. Illustrative source code 1103 is a Java statement that invokes a method setEmailAddr( ) of object instance 1000 with the String argument "john52@aol.com".

FIG. 11 also depicts illustrative source code 1104, which comprises an illustrative implementation of method setEmailAddr( ) of object instance 1000. This implementation:
- takes a String argument and copies the argument into object instance 1000's field emailAddr;
- invokes UserAliases bean 1001-1's setEmailAddr( ) method with the String argument, which creates a new UserAliases bean 1001-2 (see below);
- sets variable temp to point to UserAliases bean 1001-2;
- deletes the EJB (and its corresponding database record) currently referenced by variable u1aliases (i.e., bean 1001-1) and
- sets variable u1aliases to point to new UserAliases bean 1001-2.

FIG. 11 further depicts illustrative source code 1105, which comprises an illustrative implementation of method setEmailAddr( ) of object instance 1001-1. This implementation:
- takes a String argument a;
- creates an instance s of a class AliasSet that is a subclass of Set with additional methods for manipulating social security numbers, email addresses, and phone numbers;
- initializes the value of s to the set of aliases of object instance 1001-1;
- adds a to s (or if s already had an email address, replaces the old address with a);
- creates a new UserAlias bean 1001-2 (referred to locally as x) with field aliases set to s;
- sets the foreign key of bean 1001-2 to the foreign key of bean 1001-1; and
- returns new UserAlias bean 1001-2.

Figure 12:
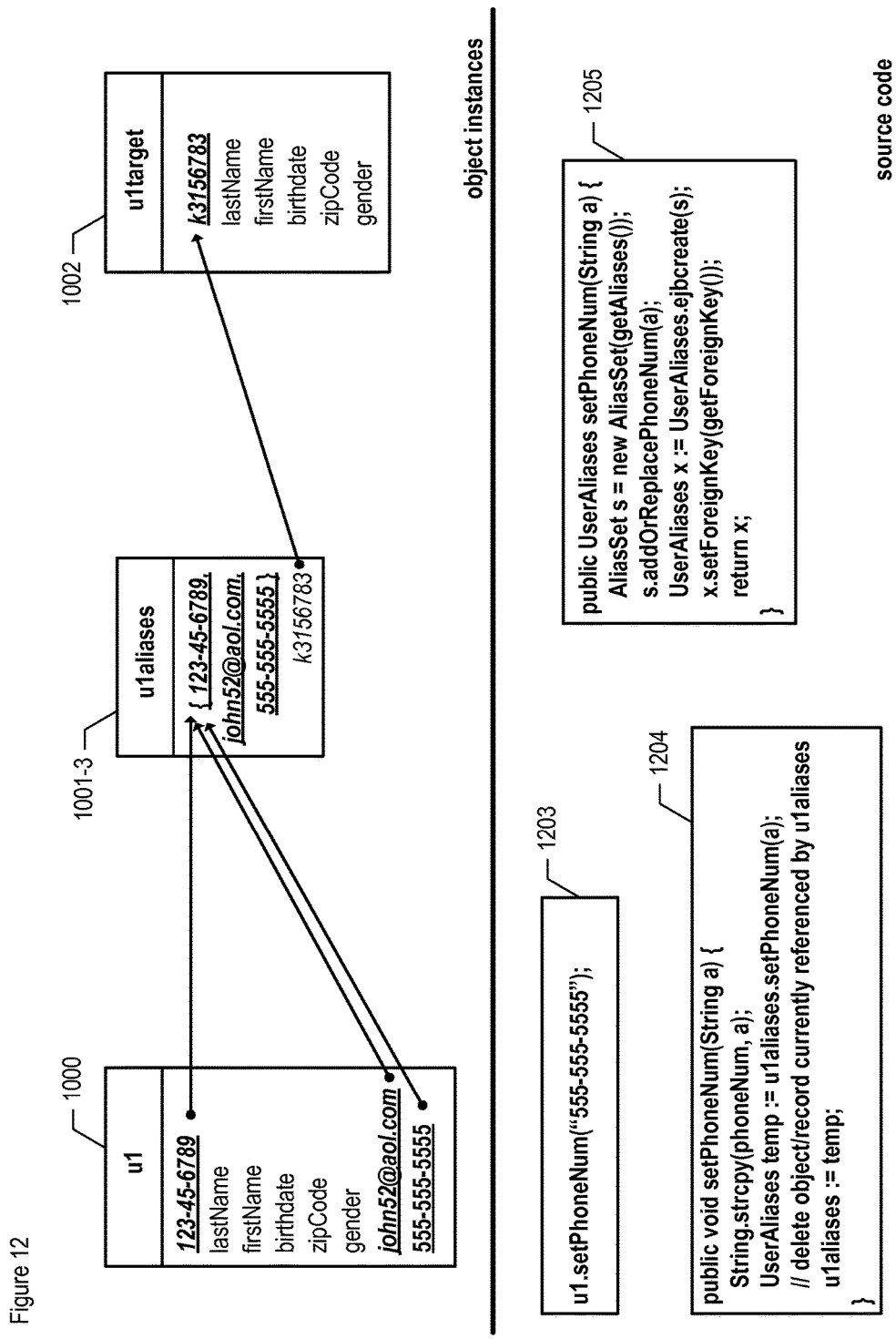
FIG. 12 depicts object instances 1000 and 1002 and new object instance 1001-3 after the execution of illustrative source code 1203, in accordance with the second illustrative embodiment of the present invention.

FIG. 12 depicts object instances 1000 and 1002 and new object instance 1001-3 after the execution of illustrative source code 1203, in accordance with the second illustrative embodiment of the present invention.

Illustrative source code 1203 is a Java statement that invokes a method setPhoneNum( ) of object instance 1000 with the String argument "555-555-5555".

FIG. 12 also depicts illustrative source code 1204, which comprises an illustrative implementation of method setPhoneNum( ) of object instance 1000. This implementation:
- takes a String argument and copies the argument into object instance 1000's field phoneNum; and
- invokes UserAliases bean 1001-2's setPhoneNum( ) method with the String argument, which creates a new UserAliases bean 1001-3 (see below);
- sets variable temp to point to UserAliases bean 1001-3;
- deletes the EJB (and its corresponding database record) currently referenced by variable u1aliases (i.e., bean 1001-2) and
- sets variable u1aliases to point to new UserAliases bean 1001-3.

FIG. 12 further depicts illustrative source code 1205, which comprises an illustrative implementation of method setPhoneNum( ) of object instance 1001-2. This implementation:
- takes a String argument a;
- creates an instance s of class AliasSet;
- initializes the value of s to the set of aliases of object instance 1001-2;
- adds a to s (or if s already had a phone number, replaces the old phone number with a);
- creates a new UserAlias bean 1001-3 (referred to locally as x) with field aliases set to s;
- sets the foreign key of bean 1001-3 to the foreign key of bean 1001-2; and
- returns UserAlias bean 1001-3.

In accordance with the second illustrative embodiment, class 500 provides the same three finder methods as class 300 of the first illustrative embodiment:
- static User findBySsn(String ssn)
- static User findByEmailAddress(String emailAddr)
- static User findByPhoneNumber(String phoneNum)

Each of these finder methods works the same way as in the first illustrative embodiment (i.e., by invoking the EJB finder method of UserAliasBean with the specified key value as argument, which in turn invokes the EJB finder method of UserTargetBean with the foreignKey value as argument, and creating a new User instance based on the retrieved UserAliasBean and UserTargetBean.

As will be appreciated by those skilled in the art, class 300 can also have data accessor methods (i.e., get methods) and "business" methods—as object classes typically do—and it will be clear to those skilled in the art, after reading this disclosure, how to make and use such embodiments of class 300.

As will further be appreciated by those skilled in the art, in accordance with the second illustrative embodiment there is a variety of options for handling the destruction of object instances (or "garbage collection"). In some embodiments in which class 300 is defined in a programming language that supports destructors (e.g., C++, etc.), class 300 might have a destructor for destroying instances of the class. In some other embodiments—including those that use a programming language with no destructors (e.g., Java, etc.)—class 300 might have unset methods (e.g., unsetEmailAddr( ), etc.) that (a) navigate to field aliases of the single associated instance of class 901; and (b) when aliases has two or more elements:
   delete the appropriate element from aliases, and
   clear the value of the appropriate field in the instance of class 300;
otherwise (aliases has one element):
   identify the single associated instance of class 302,
   destroy the instance of class 302,
   destroy the instance of class 901,
   clear the value of the particular field in the instance of class 300, and
   mark the instance of class 300 as ready for garbage collection.

As will be appreciated by those skilled in the art, in some embodiments, the destruction of instances of class 302 and 901 by an unset method might be subject to object locking via a transaction or some other means of concurrency control. Furthermore, some embodiments of the present invention that use a programming language with support for destructors might define class 300 to have both a destructor and one or more unset methods.

Figure 13:
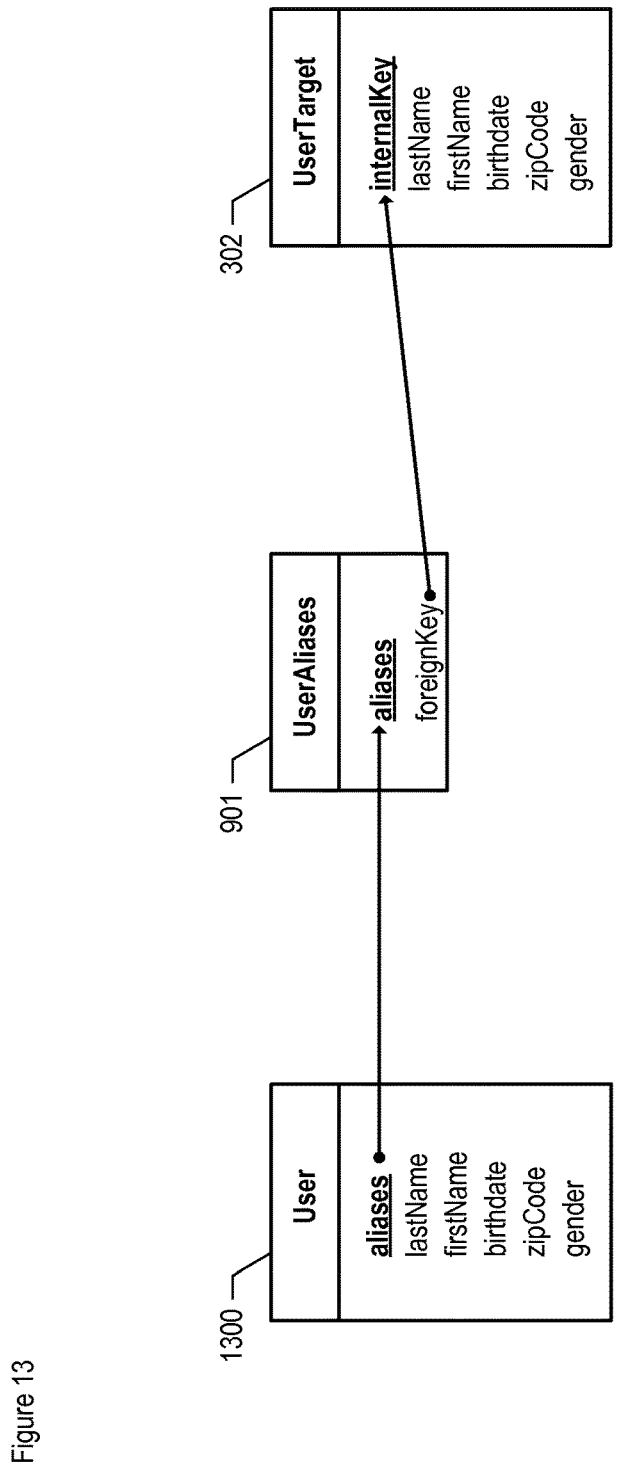
FIG. 13 depicts three illustrative object classes, in accordance with the third illustrative embodiment of the present invention.

FIG. 13 depicts three illustrative object classes, in accordance with the third illustrative embodiment of the present invention.

Object classes 901 and 302 are carried over from the second illustrative embodiment.

Object class 1300 is named User and is similar to class 300 (also named User), except that class 300's mutable key fields ssn, emailAddr, and phoneNum have been replaced with a single mutable key field aliases that is capable of storing a plurality of aliases. In the third illustrative embodiment, not only is the key field aliases in both classes 1300 and 901 capable of storing a social security number, an email address, and a phone number, but they are also capable of storing multiple phone numbers and email addresses (e.g., office and mobile phone numbers, personal and business email addresses, etc.), where each of the phone numbers and email addresses uniquely identifies an object instance.

In accordance with the third illustrative embodiment, object class 1300 is, like class 300, a regular Java class. However, it will be clear to those skilled in the art how to make and use alternative embodiments in which class 1300 is a session Enterprise JavaBean, or an inner class of a Java servlet, or some other kind of class.

Figure 14:
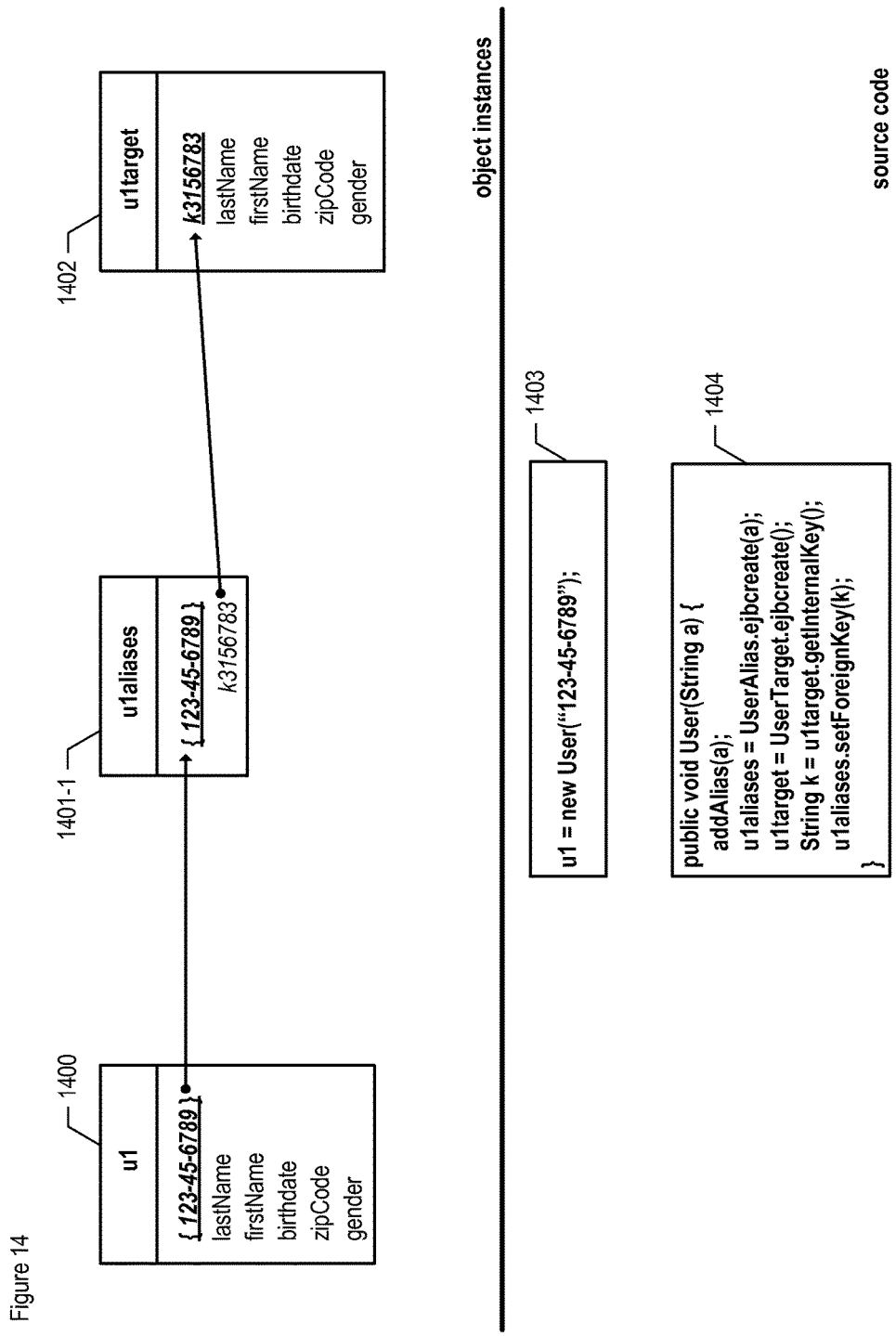
FIG. 14 depicts object instances of class 1300, 901, and 302 after the execution of illustrative source code 1403, in accordance with the third illustrative embodiment of the present invention.

FIG. 14 depicts object instances of class 1300, 901 and 302 and illustrative source code 1403 and 1404, in accordance with the third illustrative embodiment of the present invention. Object instances 1400, 1401-1, and 1402 are instances of class 1300, 901, and 302, respectively, that are created as a result of the execution of illustrative source code 1403. As shown in FIG. 14, illustrative source code 1403 creates object instance 1400 via a conventional Java constructor. It will be appreciated by those skilled in the art that in some other embodiments of the present invention, source code 1403 might instead create object instance 1000 via a factory pattern (e.g., when object instance 1400 is a session Enterprise JavaBean, etc.).

FIG. 14 also depicts illustrative source code 1404, which comprises an illustrative implementation of the User( ) constructor in accordance with the third illustrative embodiment. This implementation:

takes a String argument that corresponds to social security number;

adds the argument to object instance 1400's field aliases, which was initialized to the empty set;

creates UserAliases bean 1401-1 with its aliases field initialized to a singleton containing the social security number;

creates UserTarget bean 1402; and sets the value of the foreign key of UserAliases bean 1001-1 to the internal key of UserTarget bean 1002.

Figure 15:
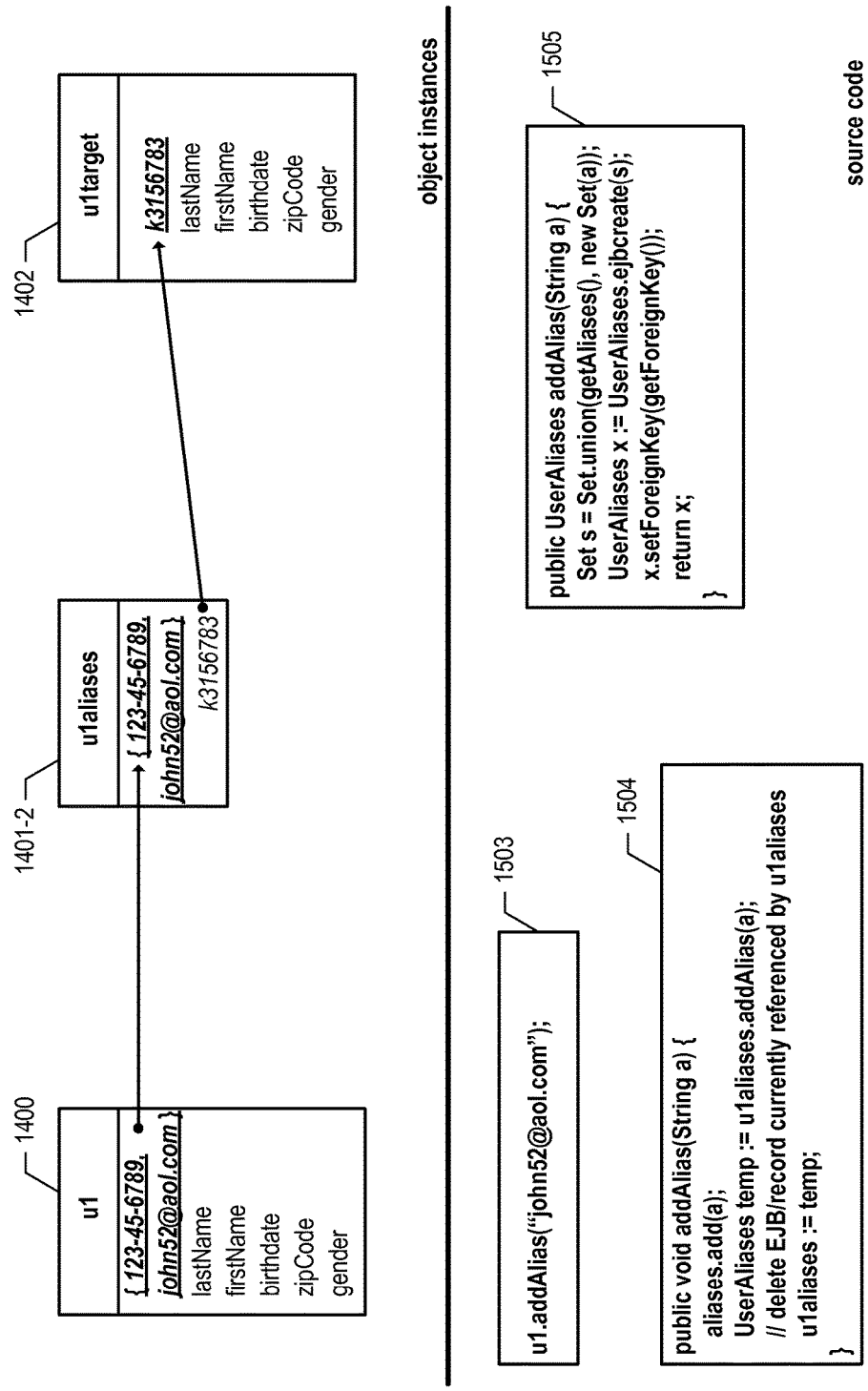
FIG. 15 depicts object instances 1400 and 1402, as shown in FIG. 14, and new object instance 1401-2 after the execution of illustrative source code 1503, in accordance with the third illustrative embodiment of the present invention.

FIG. 15 depicts object instances 1400 and 1402 and new object instance 1401-2 after the execution of illustrative source code 1403, in accordance with the third illustrative embodiment of the present invention. Illustrative source code 1503 is a Java statement that invokes a method addAlias( ) of object instance 1400 with the String argument "john52@aol.com".

FIG. 15 also depicts illustrative source code 1504, which comprises an illustrative implementation of method addAlias( ) of object instance 1400. This implementation:

takes a String argument and adds the argument to object instance 1400's field aliases;

invokes UserAliases bean 1401-1's addAlias( ) method with the String argument, which creates a new UserAliases bean 1401-2 (see below);

sets variable temp to point to UserAliases bean 1401-2;

deletes the EJB (and its corresponding database record) currently referenced by variable u1aliases (i.e., bean 1401-1) and sets variable u1aliases to point to new UserAliases bean 1401-2.

FIG. 15 further depicts illustrative source code 1505, which comprises an illustrative implementation of method addAlias( ) of object instance 1401-1. This implementation:

takes a String argument a;

sets variable s to the union of
   (i) the current aliases of object instance 1401-1, and
   (ii) set {a};

creates a new UserAlias bean 1401-2 (referred to locally as x) with field aliases set to s;

sets the foreign key of bean 1401-2 to the foreign key of bean 1401-1; and returns new UserAlias bean 1401-2.

Figure 16:
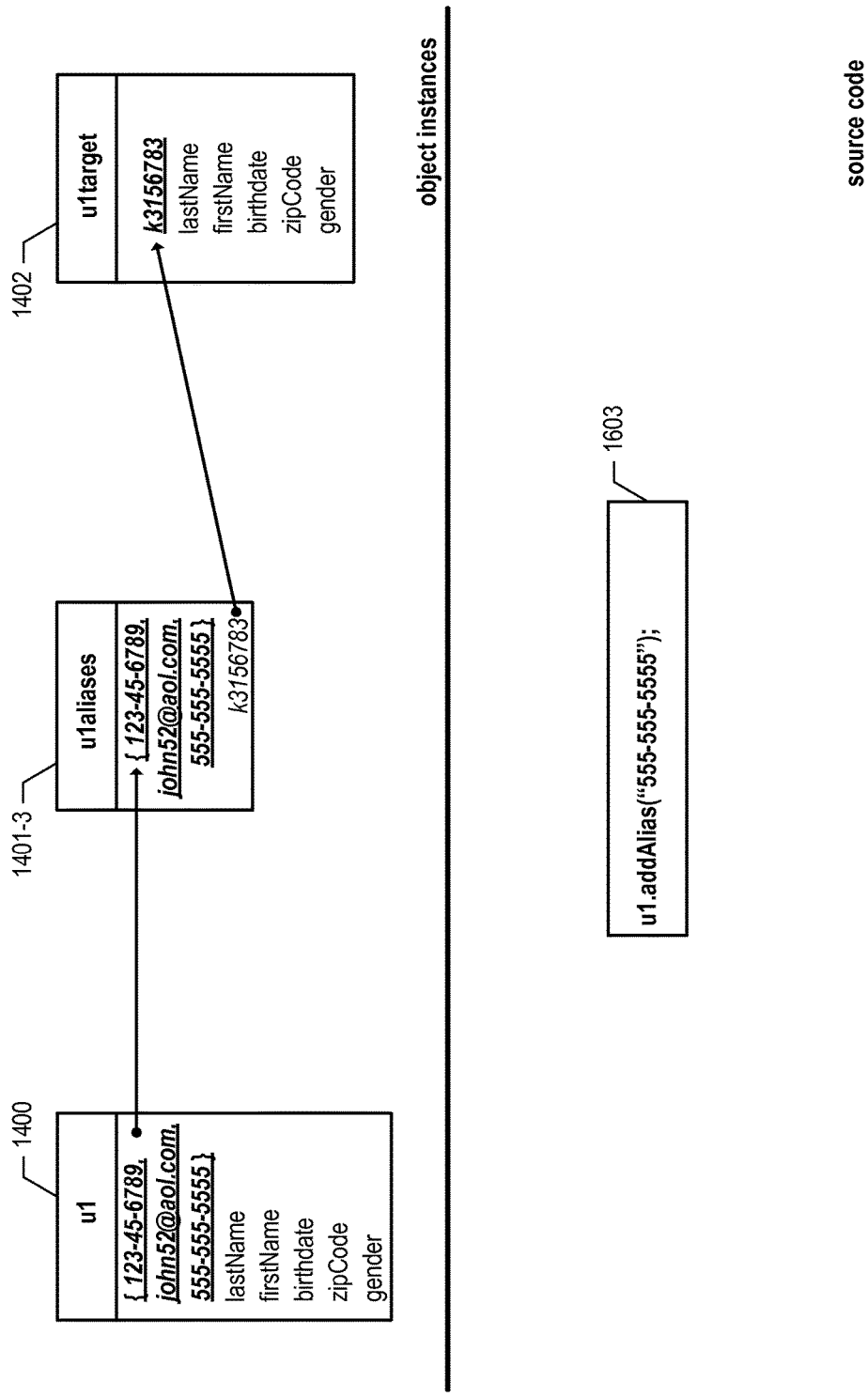
FIG. 16 depicts object instances 1400 and 1402 and new object instance 1401-3 after the execution of illustrative source code 1603, in accordance with the third illustrative embodiment of the present invention.

FIG. 16 depicts object instances 1400 and 1402 and new object instance 1401-3 after the execution of illustrative source code 1603, in accordance with the third illustrative embodiment of the present invention. Illustrative source code 1603 invokes method addAlias( ) of object instance 1400 with the String argument "555-555-5555", which executes in similar fashion as source code 1503.

Figure 17:
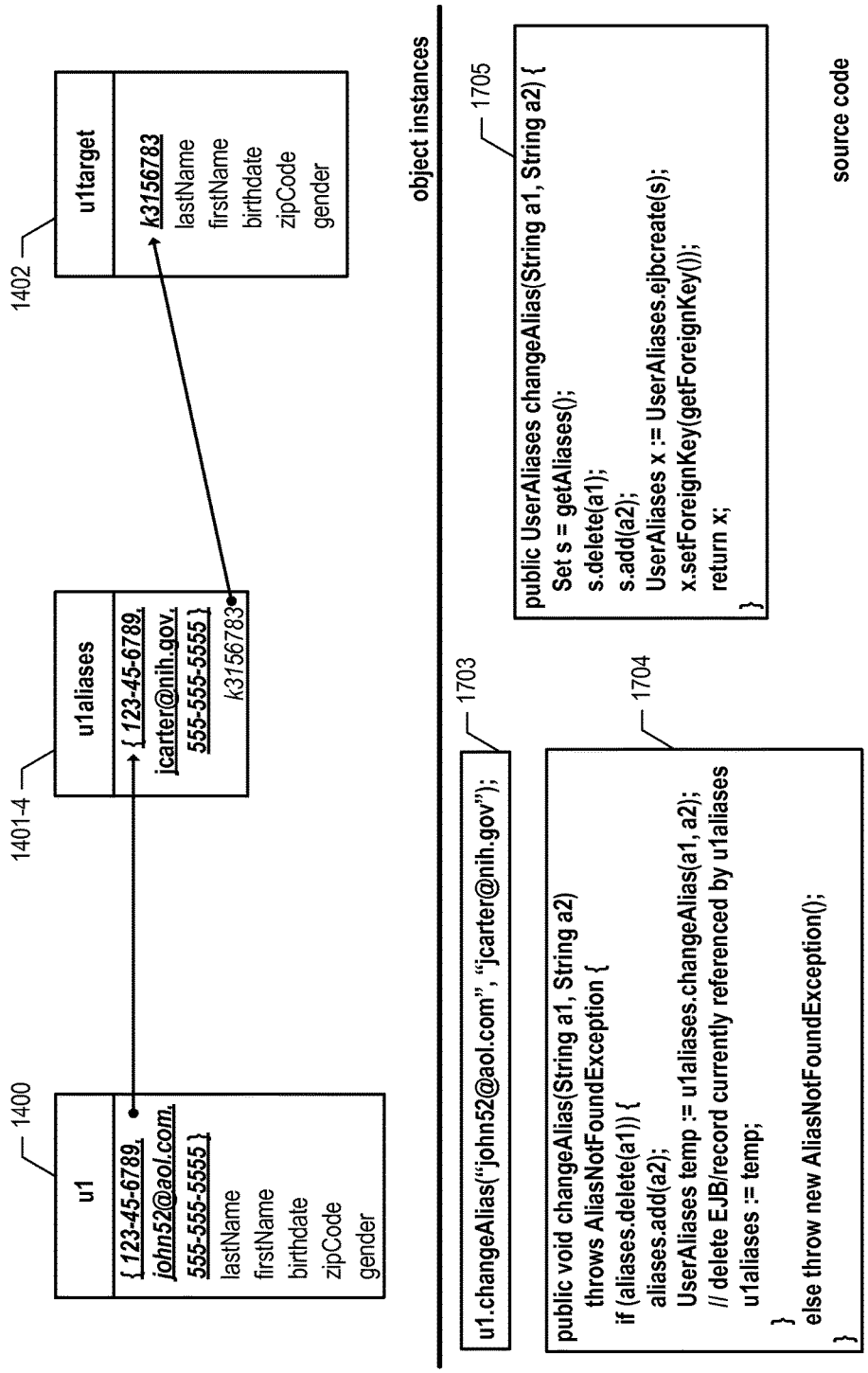
FIG. 17 depicts object instances 1400 and 1402 and new object instance 1401-4 after the execution of illustrative source code 1703, in accordance with the third illustrative embodiment of the present invention.

FIG. 17 depicts object instances 1400 and 1402 and new object instance 1401-4 after the execution of illustrative source code 1703, in accordance with the third illustrative embodiment of the present invention. Illustrative source code 1703 is a Java statement that invokes a method changeAlias( ) of object instance 1400 with the String arguments "john52@aol.com" and "jcarter@nih.gov".

FIG. 17 also depicts illustrative source code 1704, which comprises an illustrative implementation of method changeAlias( ) of object instance 1400. This implementation:

takes String arguments a1 and a2;
deletes a1 from object instance 1400's field aliases (if a1 is not an alias of object instance 1400, then an AliasNotFoundException is thrown);
adds a2 to object instance 1400's field aliases;
invokes UserAliases bean 1401-3's changeAlias( ) method with arguments a1 and a2, which creates a new UserAliases bean 1401-4 (see below);
sets variable temp to point to UserAliases bean 1401-4;
deletes the EJB (and its corresponding database record) currently referenced by variable u1aliases (i.e., bean 1401-3) and
sets variable u1aliases to point to new UserAliases bean 1401-4.

FIG. 17 further depicts illustrative source code 1705, which comprises an illustrative implementation of method changeAlias( ) of object instance 1401-3. This implementation:
takes String arguments a1 and a2;
initializes variable s to the set of aliases of object instance 1401-3;
deletes string a1 from set s;
adds string a2 to set s;
creates a new UserAlias bean 1401-4 (referred to locally as x) with field aliases set to s;
sets the foreign key of bean 1401-4 to the foreign key of bean 1401-3; and
returns new UserAlias bean 1401-4.

Figure 18:
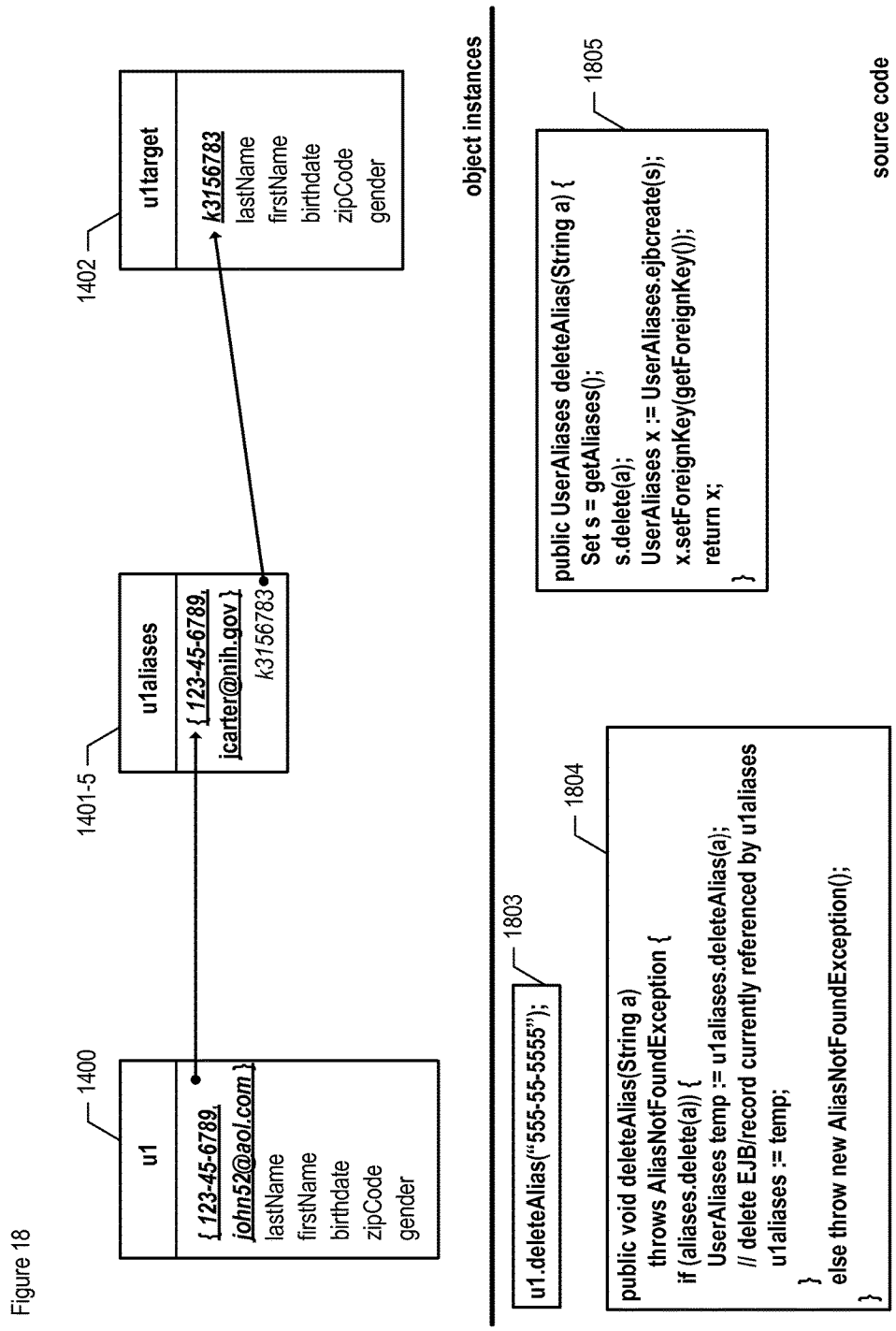
FIG. 18 depicts object instances 1400 and 1402 and new object instance 1401-5 after the execution of illustrative source code 1803, in accordance with the third illustrative embodiment of the present invention.

FIG. 18 depicts object instances 1400 and 1402 and new object instance 1401-5 after the execution of illustrative source code 1803, in accordance with the third illustrative embodiment of the present invention. Illustrative source code 1803 is a Java statement that invokes a method deleteAlias( ) of object instance 1400 with a String argument "555-555-5555".

FIG. 18 also depicts illustrative source code 1804, which comprises an illustrative implementation of method deleteAlias( ) of object instance 1400. This implementation:
takes a String argument a;
deletes a from object instance 1400's field aliases (if a is not an alias of object instance 1400, then an AliasNotFoundException is thrown);
invokes UserAliases bean 1401-4's deleteAlias( ) method with argument a, which creates a new UserAliases bean 1401-5 (see below);
sets variable temp to point to UserAliases bean 1401-5;
deletes the EJB (and its corresponding database record) currently referenced by variable u1aliases (i.e., bean 1401-4) and
sets variable u1aliases to point to new UserAliases bean 1401-5.

FIG. 18 further depicts illustrative source code 1805, which comprises an illustrative implementation of method deleteAlias( ) of object instance 1401-4. This implementation:
takes String argument a;
initializes variable s to the set of aliases of object instance 1401-4;
deletes string a from set s;
creates a new UserAlias bean 1401-5 (referred to locally as x) with field aliases set to s;
sets the foreign key of bean 1401-5 to the foreign key of bean 1401-4; and
returns new UserAlias bean 1401-5.

Figure 19:
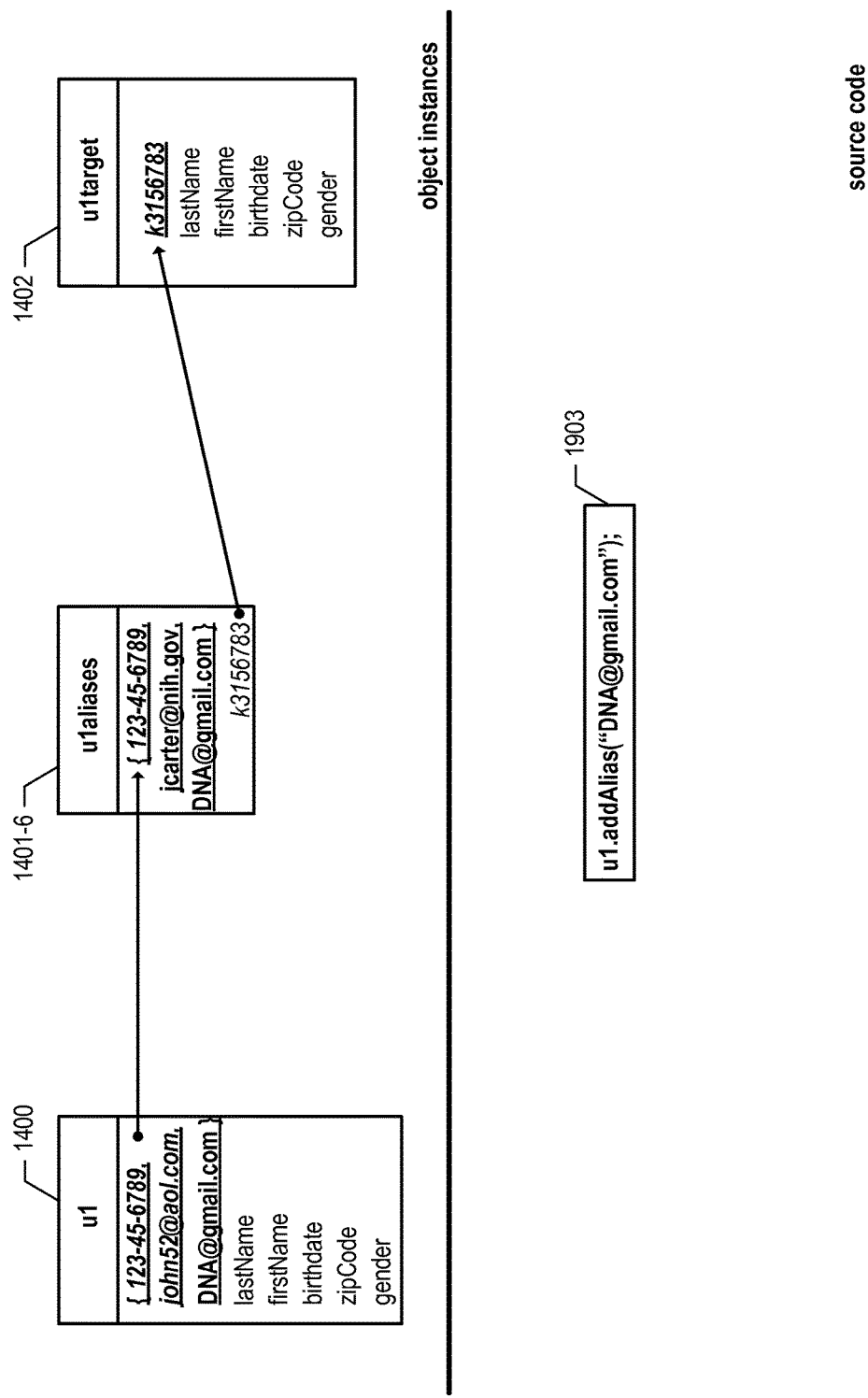
FIG. 19 depicts object instances 1400 and 1402 and new object instance 1401-6 after the execution of illustrative source code 1903, in accordance with the third illustrative embodiment of the present invention.

FIG. 19 depicts object instances 1400 and 1402 and new object instance 1401-6 after the execution of illustrative source code 1603, in accordance with the third illustrative embodiment of the present invention. Illustrative source code 1603 invokes method addAlias( ) of object instance 1400 with the String argument "DNA@gmail.com", which executes in similar fashion as source code 1503 and 1603. Thus in the third illustrative embodiment of the present invention, it is possible for a user to have a plurality of email address aliases. It will be clear to those skilled in the art how to augment the third illustrative embodiment to allow only one social security number alias per user, while still permitting multiple aliases for other types of information (e.g., email addresses, phone numbers, etc.).

In some operating environments the third illustrative embodiment enjoys a performance advantage over the first and second illustrative embodiments. However, the third illustrative embodiment has the following disadvantage: an implementation for finder methods based on a single key value (i.e., a social security number or an email address or a phone number) cannot simply invoke the EJB finder method of UserAliases, as is done in the first and second illustrative embodiments. For example, in accordance with the third illustrative embodiment, implementing such finder methods for User (e.g., findBySsn, findByEmailAddress, findByPhoneNumber, etc.) requires one or more queries to determine whether a given key value is contained in the aliases field of UserAliases bean instances.

As will be appreciated by those skilled in the art, class 1300 can also have data accessor methods (i.e., get methods) and "business" methods—as object classes typically do— and it will be clear to those skilled in the art, after reading this disclosure, how to make and use such embodiments of class 1300.

As will further be appreciated by those skilled in the art, in accordance with the third illustrative embodiment there is a variety of options for handling the destruction of object instances (or "garbage collection"). In some embodiments in which class 1300 is defined in a programming language that supports destructors (e.g., C++, etc.), class 1300 might have a destructor for destroying instances of the class. In some other embodiments—including those that use a programming language with no destructors (e.g., Java, etc.)—class 1300 might have unset methods (e.g., unsetEmailAddr( ), etc.) that
  (a) navigate to field aliases of the single associated instance of class 901; and
  (b) when aliases has two or more elements:
    delete the appropriate element from aliases, and
    delete the same element from field aliases of the instance of class 1300;
  otherwise (aliases has one element):
    identify the single associated instance of class 302,
    destroy the instance of class 302,
    destroy the instance of class 901,
    set field aliases of the instance of class 1300 to the empty set, and
    mark the instance of class 1300 as ready for garbage collection.

As will be appreciated by those skilled in the art, in some embodiments, the destruction of instances of class 302 and 901 by an unset method might be subject to object locking via a transaction or some other means of concurrency control. Furthermore, some embodiments of the present invention that use a programming language with support for destructors might define class 1300 to have both a destructor and one or more unset methods.

As will also be appreciated by those skilled in the art, in some embodiments of the present invention—whether in accordance with the first, second, or third illustrative embodiments—it might be advantageous for the "behind-the-scenes" Enterprise JavaBean classes and instances (e.g., classes 301 and 302 and their instances, etc.), as well as the code for creating and manipulating these classes and instances, to be automatically generated (e.g., by an application server, by an integrated development environment, etc.) rather than hand-coded by a developer. In such embodiments, a developer might create the "front-end" classes and instances (e.g., class 300 and its instances, etc.) and not even be aware of the existence of the behind-the-scenes classes and instances that are automatically generated.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc. A computer-readable storage medium or device as described herein expressly excludes transitory signals per se and other transitory mediums such as carrier waves, wires, cables, fiber optics, infrared media, and the like.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   identifying a non-persistent object instance comprising:
   a first field having a first value configured to be mirrored in a database; and
   a mutable primary key that uniquely identifies the non-persistent object instance, wherein the mutable primary key is a mutable value that can change during a life of the non-persistent object instance;
   identifying a first persistent object instance comprising:
   a first immutable primary key associated with the mutable primary key of the non-persistent object instance; and
   a foreign key;
   identifying a second persistent object instance comprising:
   a second immutable primary key associated with the foreign key; and
   a second field having a second value mirroring the first value, wherein the second field is configured to further mirror the second value to the database;
   destroying the second persistent object instance;
   destroying the first persistent object instance after the second persistent object instance is destroyed;
   clearing the mutable primary key from the non-persistent object instance after the first persistent object instance is destroyed; and
   marking, via a processor, the non-persistent object instance for garbage collection after the mutable primary key is cleared.

2. The method of claim 1, further comprising marking the first persistent object instance for garbage collection.

3. The method of claim 1, wherein the first and second persistent object instances are Enterprise JavaBean entity beans.

4. The method of claim 1, wherein the first immutable primary key is further associated with the first field.

5. The method of claim 1, further comprising marking the second persistent object instance for garbage collection.

6. The method of claim 1, wherein the non-persistent object instance is associated with a person.

7. The method of claim 1, wherein the mutable primary key is associated with at least one of an email address, a social security number, or a telephone number.

8. A non-transitory computer-readable storage device storing instructions which, when executed by a processor, cause the processor to perform operations comprising:
   identifying a non-persistent object instance comprising:
   a first field having a first value configured to be mirrored in a database; and
   a mutable primary key that uniquely identifies the non-persistent object instance, wherein the mutable primary key is a mutable value that can change during a life of the non-persistent object instance;
   identifying a first persistent object instance comprising:
   a first immutable primary key associated with the mutable primary key of the non-persistent object instance; and
   a foreign key;
   identifying a second persistent object instance comprising:
   a second immutable primary key associated with the foreign key; and
   a second field having a second value mirroring the first value, wherein the second field is configured to further mirror the second value to the database;
   destroying the second persistent object instance;
   destroying the first persistent object instance after the second persistent object instance is destroyed;
   clearing the mutable primary key from the non-persistent object instance after the first persistent object instance is destroyed; and
   marking the non-persistent object instance for garbage collection after the mutable primary key is cleared.

9. The non-transitory computer-readable storage device of claim 8, storing additional instructions which, when executed by the processor, cause the processor to perform further operations comprising changing the mutable value.

10. The non-transitory computer-readable storage device of claim 8, wherein one of the first and second persistent object instances is an Enterprise JavaBean entity bean.

11. The non-transitory computer-readable storage device of claim 8, storing additional instructions which, when executed by the processor, cause the processor to perform further operations comprising marking the first persistent object instance for garbage collection.

12. The non-transitory computer-readable storage device of claim 8, wherein the first immutable primary key is further associated with the first field.

13. The non-transitory computer-readable storage device of claim 8, storing additional instructions which, when executed by the processor, cause the processor to perform further operations comprising marking the second persistent object instance for garbage collection.

14. The non-transitory computer-readable storage device of claim 8, wherein the mutable primary key is associated with at least one of an email address, a social security number, or a telephone number.

15. A system comprising:
a processor; and
a non-transitory computer-readable storage medium storing instructions which, when executed by the processor, cause the processor to perform operations comprising:
identifying a non-persistent object instance, comprising:
a first field having a first value configured to be mirrored in a database; and
a mutable primary key that uniquely identifies the non-persistent object instance, wherein the mutable primary key is a mutable value that can change during a life of the non-persistent object instance;
identifying a first persistent object instance comprising:
a first immutable primary key associated with the mutable primary key of the non-persistent object instance; and
a foreign key;
identifying a second persistent object instance comprising:
a second immutable primary key associated with the foreign key; and
a second field having a second value mirroring the first value,
wherein the second field is configured to further mirror the second value to the persistent store;
destroying the second persistent object instance;
destroying the first persistent object instance after the second persistent object instance is destroyed;
clearing the mutable primary key from the non-transitory object instance after the first persistent object instance is destroyed; and
marking the non-persistent object instance for garbage collection after the mutable primary key is cleared.

16. The system of claim 15, wherein the non-transitory computer-readable storage medium stores additional instructions which, when executed by the processor, cause the processor to perform further operations comprising changing the mutable value.

17. The system of claim 15, wherein the first and second persistent object instances are Enterprise JavaBean entity beans.

18. The system of claim 15, wherein the non-transitory computer-readable storage medium stores additional instructions which, when executed by the processor, cause the processor to perform further operations comprising marking the first persistent object instance for garbage collection.

19. The system of claim 15, wherein the first immutable primary key is associated with the first field.

20. The system of claim 15, wherein the non-transitory computer-readable storage medium stores additional instructions which, when executed by the processor, cause the processor to perform further operations comprising marking the second persistent object instance for garbage collection.

21. The system of claim 15, wherein the mutable primary key is associated with at least one of an email address, a social security number, or a telephone number.

* * * * *